Oct. 10, 1933.   W. H. ROBERTSON   1,929,652
CASH REGISTER
Filed Feb. 19, 1927   12 Sheets-Sheet 2

Inventor
William H. Robertson
By
His Attorneys

Oct. 10, 1933.  W. H. ROBERTSON  1,929,652
CASH REGISTER
Filed Feb. 19, 1927   12 Sheets-Sheet 3

Inventor
William H. Robertson
By
His Attorney

Oct. 10, 1933.  W. H. ROBERTSON  1,929,652
CASH REGISTER
Filed Feb. 19, 1927  12 Sheets-Sheet 4
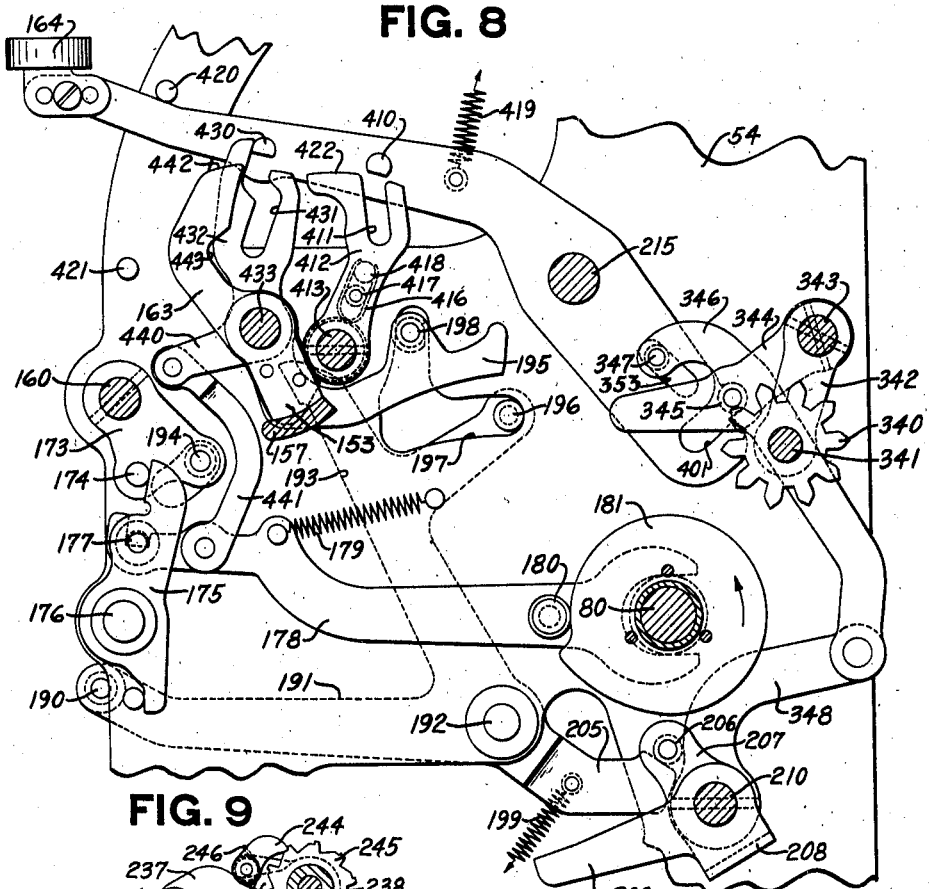
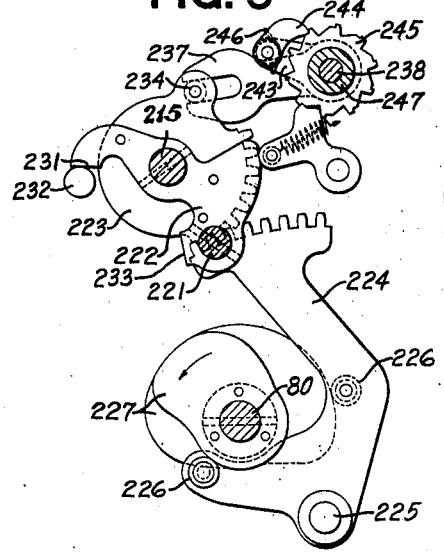
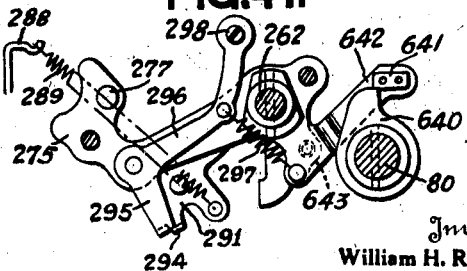
Inventor
William H. Robertson
By
Carl Beust
Henry E. Stauffer
His Attorneys

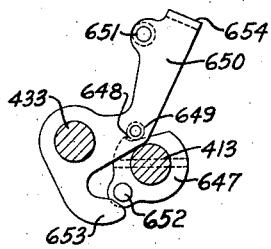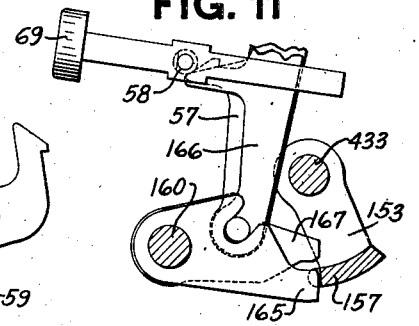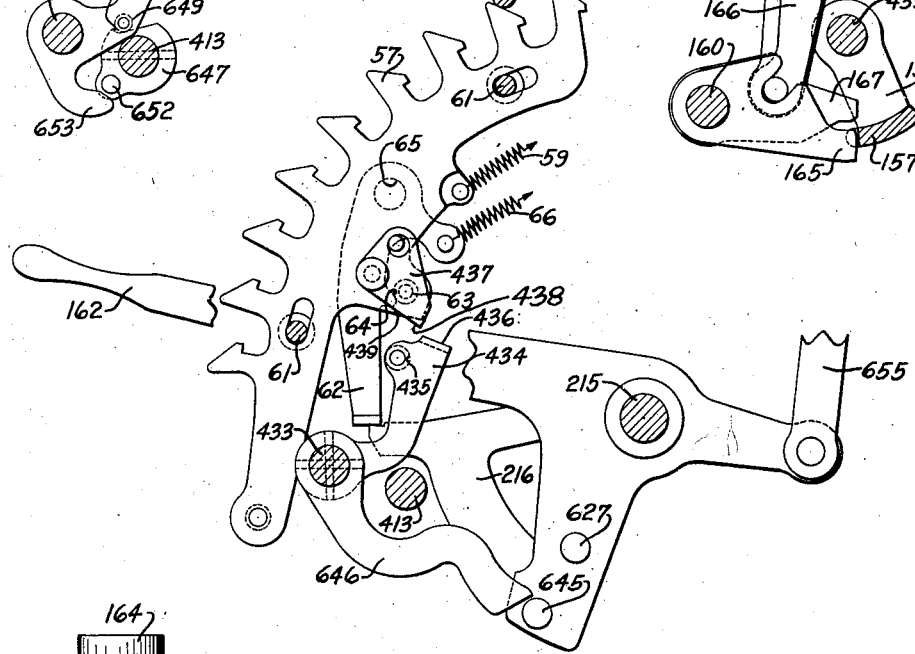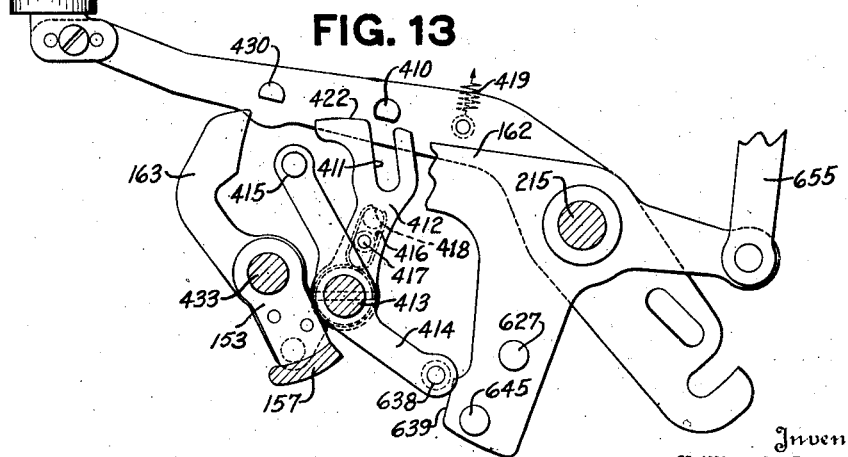

Oct. 10, 1933.  W. H. ROBERTSON  1,929,652
CASH REGISTER
Filed Feb. 19, 1927   12 Sheets-Sheet 6

Inventor
William H. Robertson

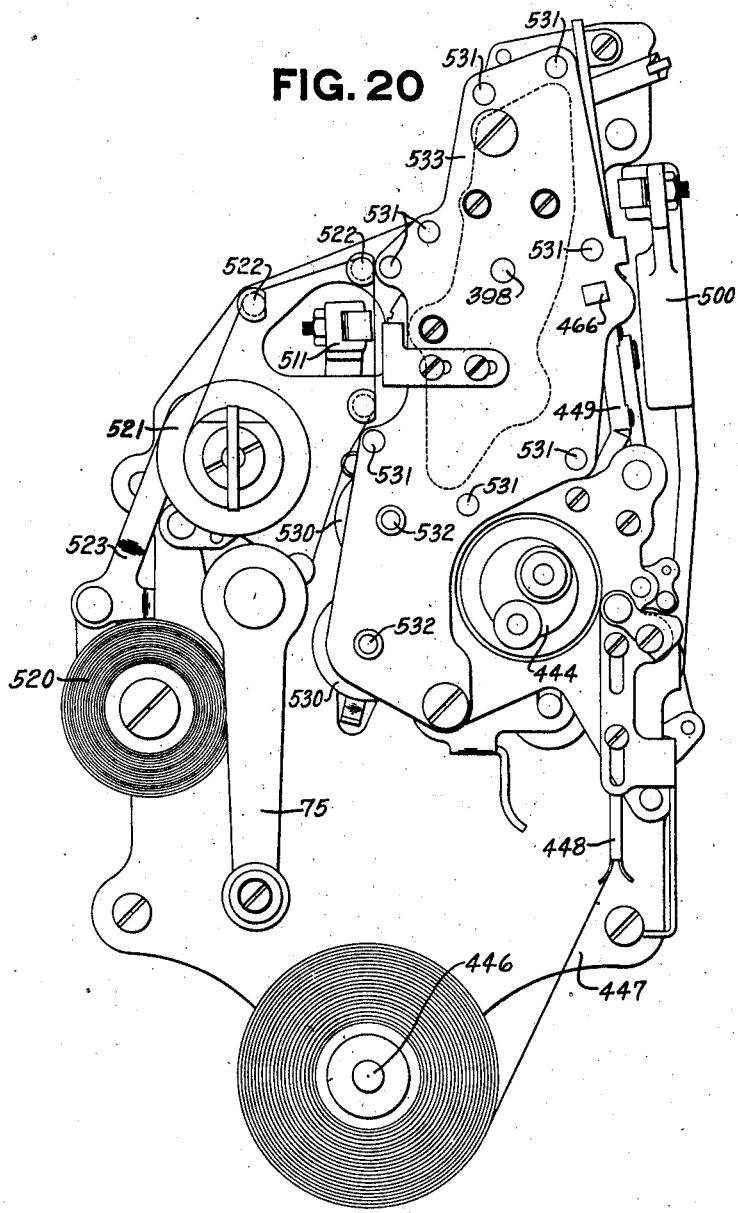

Oct. 10, 1933.  W. H. ROBERTSON  1,929,652
CASH REGISTER
Filed Feb. 19, 1927   12 Sheets-Sheet 9

Inventor
William H. Robertson
By
His Attorneys

Oct. 10, 1933.  W. H. ROBERTSON  1,929,652
CASH REGISTER
Filed Feb. 19, 1927  12 Sheets-Sheet 10

Inventor
William H. Robertson
By *Earl Beust*
*Henry E. Stauffer*
His Attorneys

Oct. 10, 1933.  W. H. ROBERTSON  1,929,652
CASH REGISTER
Filed Feb. 19, 1927   12 Sheets-Sheet 11
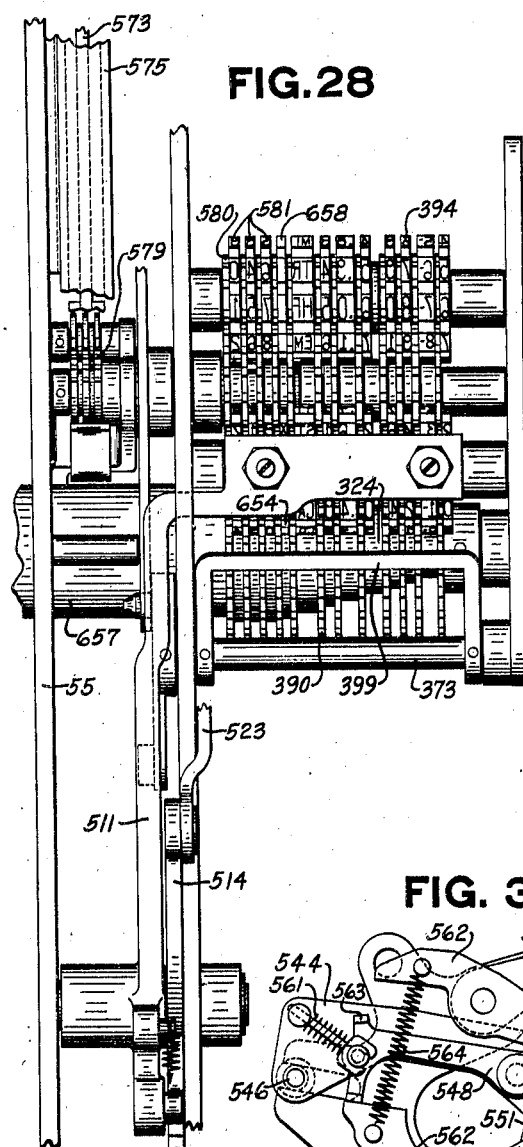
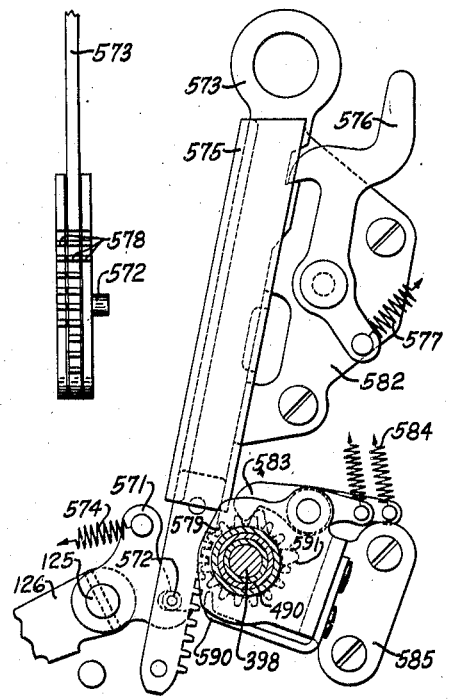
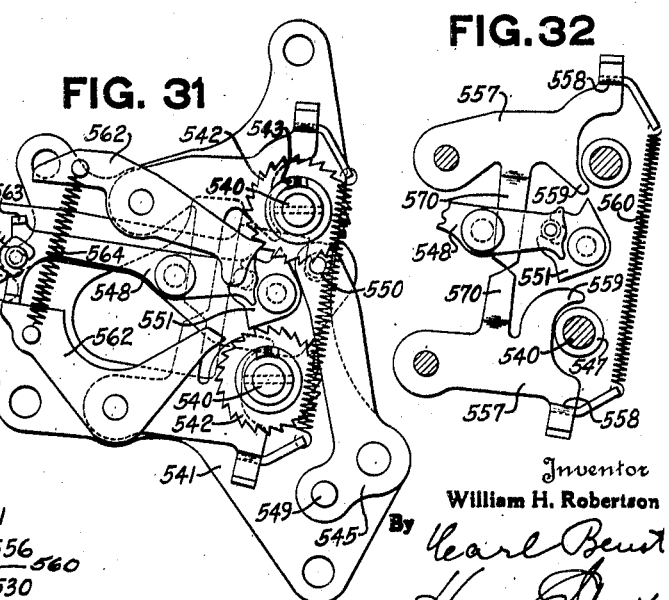
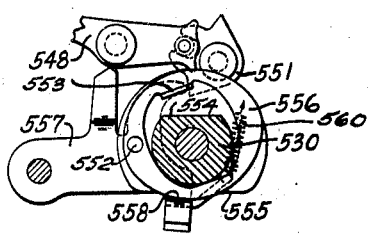
Inventor
William H. Robertson
His Attorneys Oct. 10, 1933.  W. H. ROBERTSON  1,929,652
CASH REGISTER
Filed Feb. 19, 1927   12 Sheets-Sheet 12

Inventor
William H. Robertson
By Pearl Beust
Henry E. Stauffer
His Attorneys

Patented Oct. 10, 1933

1,929,652

UNITED STATES PATENT OFFICE 1,929,652

CASH REGISTER

William H. Robertson, Dayton, Ohio, assignor to The National Cash Register Company, Dayton, Ohio, a corporation of Maryland Application February 19, 1927. Serial No. 169,583

62 Claims. (Cl. 235—7)

This invention relates to improvements in cash registers, and more particularly to the type shown and described in the United States Letters Patent No. 1,816,263, granted July 28, 1931.

One object of this invention is to provide an improved cash register for use on bus lines and the like.

Another object is to provide a machine by means of which an entry can be repeated without knowledge on the part of the operator before the item is entered that the item is to be repeated.

Another object is to provide a novel repeat mechanism by means of which a previous entry can be repeated without rendering the repeat mechanism effective before the original entry of the amount, thereby permitting the operator to repeat the entry at any time after the entry has been made.

Still another object is to provide a novel mechanism for rendering the repeat mechanism ineffective upon depression of an amount key.

Another object is to prove stay-down keys, the setting of which can be changed without affecting the operation of the repeat mechanism.

Another object is to provide a novel repeat release key for causing the last amount entered to be again entered, said key also being adapted to release the machine for the repeat operation.

Another object is to provide improved means for setting type characters during item entering operations and for printing higher order digits during total taking operations.

Another object is to provide a novel means for automatically controlling said improved means for printing higher orders when the total lever is moved to the total taking position.

Another object is to provide an improved insertible operator's key.

Another object is to provide a novel locking device for locking the motor bar against accidental depression.

While the forms of mechanisms herein shown and described are admirably adapted to fulfill the objects primarily stated, it is to be understood that it is not intended to confine the invention to the forms or embodiments herein disclosed, for it is susceptible of embodiment in various forms all coming within tht scope of the claims which follow.

In the drawings:

Fig. 8 is a detail view of the repeat release key together with its associated mechanism.

Fig. 9 is a detail view of the customer counter and the totalizer differential operating mechanism.

Fig. 10 is a detail view of one of the zero stop pawls in the "From" banks, which banks are the two left hand banks shown in Fig. 1.

Fig. 11 is a detail view of a part of the interlocking mechanism in the transaction bank.

Fig. 12 is a detail view of the interlock between the total control lever and the amount banks of keys.

Fig. 13 is a detail view of the repeat release key and interlocks associated therewith.

Fig. 20 is a side elevation of the printing mechanism.

Fig. 21 is a facsimile of the ticket issued by the machine.

Fig. 22 is a facsimile of a portion of the detail strip printed by the machine.

Fig. 28 is a detail front view of a part of the type wheel adjusting mechanism.

Fig. 29 is a rear elevation of one form of operator's key.

Fig. 30 is a side elevation of the form of operator's key shown in Fig. 29, and its associated mechanism.

Fig. 31 is a detail view of the ribbon feed and reversing mechanism.

Fig. 32 is a detail view of a part of the reversing mechanism shown in Fig. 31.

Fig. 33 is a detail view of one end of one of the ink ribbon spools and associated mechanism.

Fig. 41 is a detail view of the means for holding totalizer frame in its normal position during the time the total lever is being adjusted to a new position.

General description

Figure 1:
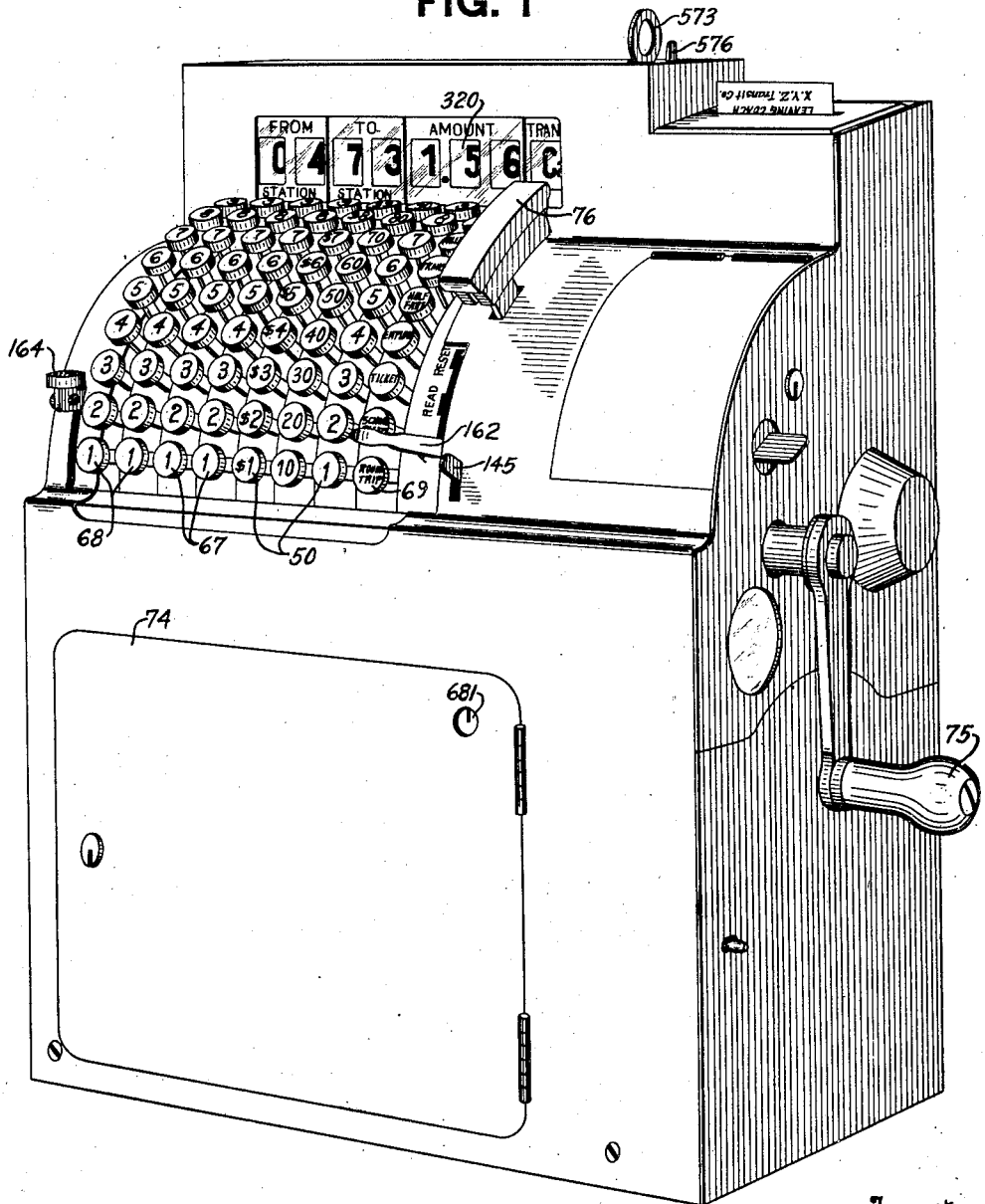
Fig. 1 is a perspective view of the machine, enclosed within its cabinet.

The machine as disclosed herein is adapted to be used on bus lines, either on the bus itself or in the ticket office. As disclosed, this machine is provided with a single bank of transaction keys to record the various kinds of fares entered in the machine, and four banks of keys for setting up the station at which the passenger boards the bus and the station to which the passenger is going. Two banks have been set aside for the "From" stations and two for the "To" stations, thereby providing for 99 stations in each case. The machine is also provided with three banks of amount keys for setting up the amount of fare.

If the machine is to be used in a station instead of on the bus itself, the four banks are all used for the destination stations, thereby making it possible to set up a total of 9999 destination stations. In such a machine the "From" station would be printed by means of a fixed electro.

A repeat release key is provided by means of which the operator may issue as many tickets of the same value as desired. The characteristic feature of this repeat release key lies in the fact that the operator need not know at the time of making the original entry whether or not a repeat operation is to be performed.

If two or more passengers get on the bus at the same station and each is going to the same destination, the operator sets up the amount of fare, the destination and the station at which the passengers board the bus, for the first passenger and issues his ticket. Thereafter as the other passengers board the bus, all the operator need do is to press the repeat release key, which will release the machine and cause a ticket to be issued for the next passenger.

A total control lever is provided for controlling the machine for add, read or reset operations. A motor bar is provided for releasing the machine for operation. The machine may be operated either by an electric motor or by hand, as may be convenient.

An operator's key is provided, which must be inserted in the machine before the machine can be released for operation, thus providing a means for identifying the operator who issues the ticket.

Detailed Description

Amount banks

The machine is provided with three banks of amount keys 50 (Figs. 1 and 3), the keys of each bank being slidably mounted in a key frame 51, supported on rods 52 and 53. The rods 52 and 53 are carried in side frames 54 and 55, Figs. 3, 14 and 19. Each key 50 is held in its outer or normal position by means of a coil spring 56 (Fig. 2), which surrounds the shank of the key in the usual and well-known manner. Each bank is provided with a flexible detent 57 (see also Fig. 3), with which a stud 58 secured to each key 50 co-operates. The depression of a key will cause the detent 57 to be cammed downwardly against the tension of a spring 59 until the stud passes the shoulder on the detent 57, whereupon the spring 59 will cause the detent to be moved upwardly, thereby holding the key in its depressed position.

Each bank is also provided with a locking detent 60, which upon release of the machine is moved upwardly by mechanism to be hereinafter described, thereby moving beneath the studs 58 of the undepressed keys, and over the stud 58 of the depressed key, thereby locking the undepressed keys in their outer positions and the depressed key in its inner position. The flexible detent 57 and the locking detent 60 are carried on two studs 61, (Figs. 2 and 3) secured to the key frame 51.

Figure 2:
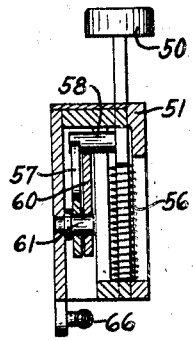
Fig. 2 is a detail sectional view taken on line 2—2, Fig. 3, and looking in the direction of the arrows.
Figure 3:
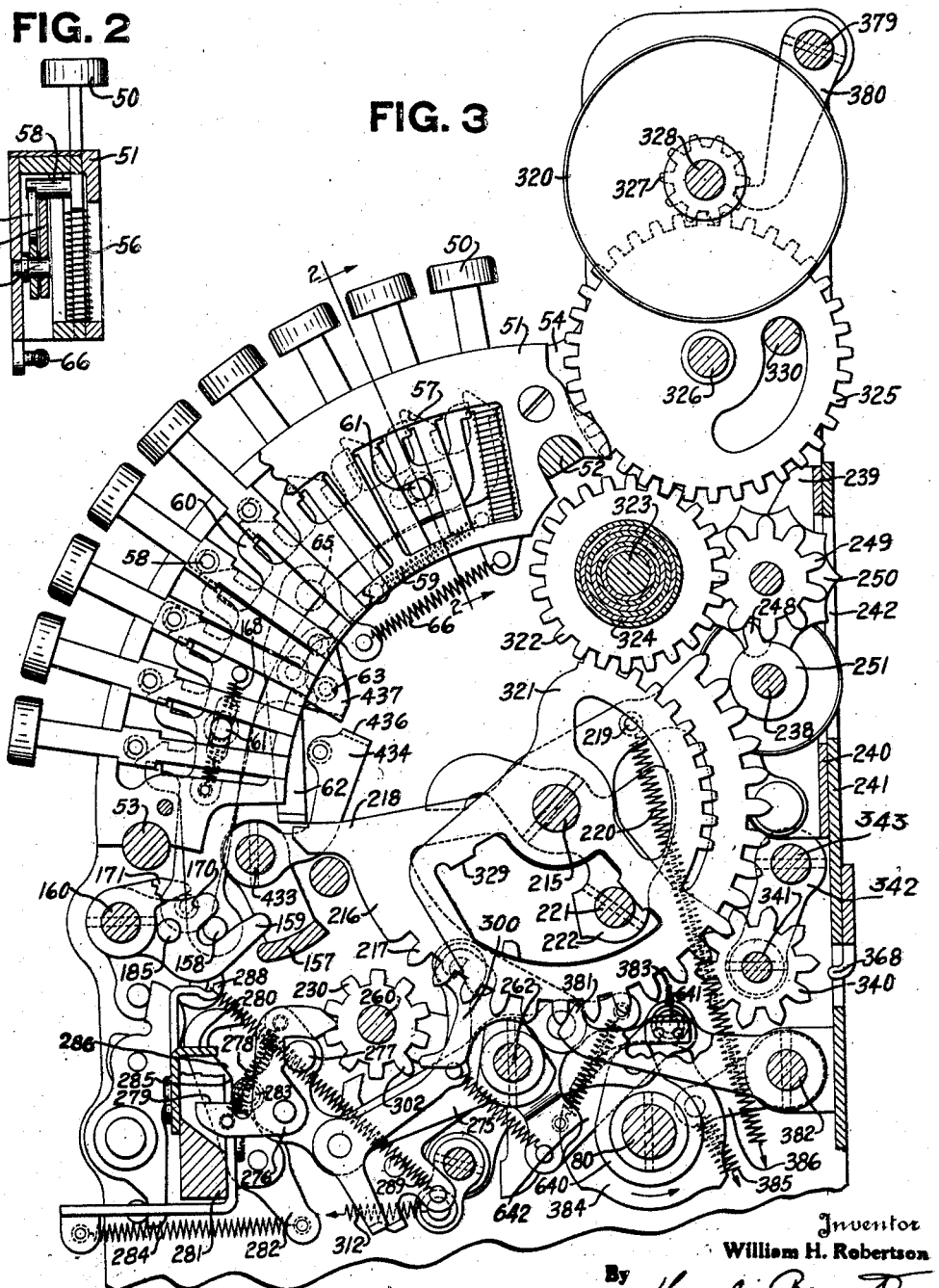
Fig. 3 is a vertical cross-sectional view, showing one of the amount banks and its associated mechanism.

Each bank of amount keys is provided with a zero stop pawl 62 (Figs. 3 and 12) for controlling the differential mechanism to be later described, when no key is depressed in the bank. The pawl 62 is rocked to its ineffective position by means of a stud 63, carried by the flexible detent 57, when any key is depressed. Depression of a key will cause the detent 57 to be lowered, as above described, thereby rocking the pawl 62 in a clockwise direction by engagement of the stud 63 with a shoulder 64 on the pawl 62. The pawl is pivoted to the key frame 51 by means of a stud 65 and is held in engagement with the stud 63 at all times by means of a spring 66 (Fig. 12) stretched between a stud on the pawl and a stud on the key frame 51, as shown in Figs. 2 and 3. These springs 66, therefore, restore all of the zero stop pawls 62 to their normal positions at each operation. During repeating operations, to be later described, the springs 66 associated with the "To" and amount banks assist in restoring certain parts (later described) to their home positions.

Station banks

The four left hand banks of keys 67 and 68 known herein as "To" and "From" banks, are of the same construction as the amount banks. The two "From" banks of keys are what are known in the art as "stay-down" keys, that is, the keys are not released at the end of the operation of the machine. This result is obtained by preventing operation of the flexible detent at the end of the operation of the machine, as will be hereinafter described. With this exception, the construction of the station banks of keys is identical with the construction of the amount banks and therefore no further description is thought necessary.

Transaction bank

The transaction bank of keys 69, is also constructed similar to the amount banks of keys, and are stay-down keys. These keys are used for printing identification characters and indicating the kinds of fares entered in the machine. This bank is provided with an interlock which makes it necessary for a key in this bank to be in depressed position before the machine can be released for operation. Inasmuch as one of the keys in this bank must be in depressed position, the differential mechanism need never stop at zero, and for this reason the zero stop pawl 62, which has been provided in the amount banks and in the "To" and "From" banks, has been left out of the transaction bank.

Operating mechanism

After the operator has depressed the desired keys representing the transaction, he may operate the machine either by means of a crank 75 (Fig. 1) or by means of an electric motor. The motor is located beneath the registering mechanism and access thereto may be had through a door 74 in the front of the cabinet. Depression of a motor bar 76 will cause the clutch mechanism controlling the motor to trip. Such a mechanism is shown and described in United States Letters Patent to Kettering and Chryst, No. 1,144,418, dated June 29, 1915. Release of the motor will cause a main cam shaft 80 (Figs. 3 and 19), to receive one complete rotation which will operate the machine, by means of a train of mechanism, including pinion 81, pinions 82 and 83 secured together and mounted on a stud 84, and pinion 85 which is secured to a worm gear 86 which meshes with a worm gear 87 on the main cam shaft 80. Pinion 81 is secured by a sleeve clutch to one member of the motor clutch above referred to. Therefore, when the motor clutch is driven, the pinion 81 through the train of pinions and gears 82, 83, 85, 86 and 87, will cause the main cam shaft 80 to receive one complete rotation on every operation of the machine.

Figure 26:
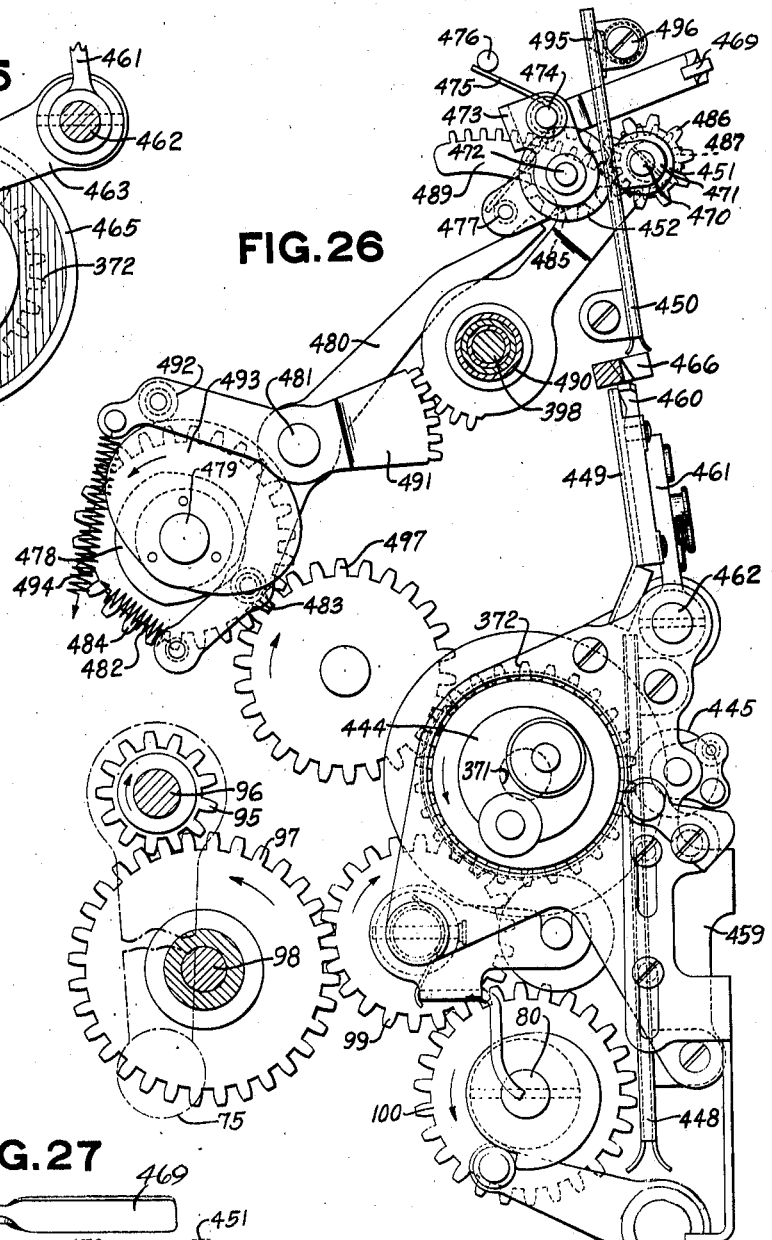
Fig. 26 is a detail view showing the check paper feed and ejector mechanism.

When the machine is operated by means of the crank 75, (Fig. 26) the main cam shaft 80 is given one complete rotation by means of the following train of gears. The crank 75 is clutched to a pinion 95 mounted on a stud 96 carried by the right side frame 55. The pinion 95 meshes with a gear 97, loosely mounted on a stud 98. The gear 97 meshes with an idler gear 99 which in turn meshes with a gear 100 on the main cam shaft 80. The ratio of the gears in this train of gears is such that in order to give the cam shaft 80 one complete rotation, it is necessary to give the crank 75 two complete rotations for each operation of the machine.

Machine releasing mechanism

Figure 4:
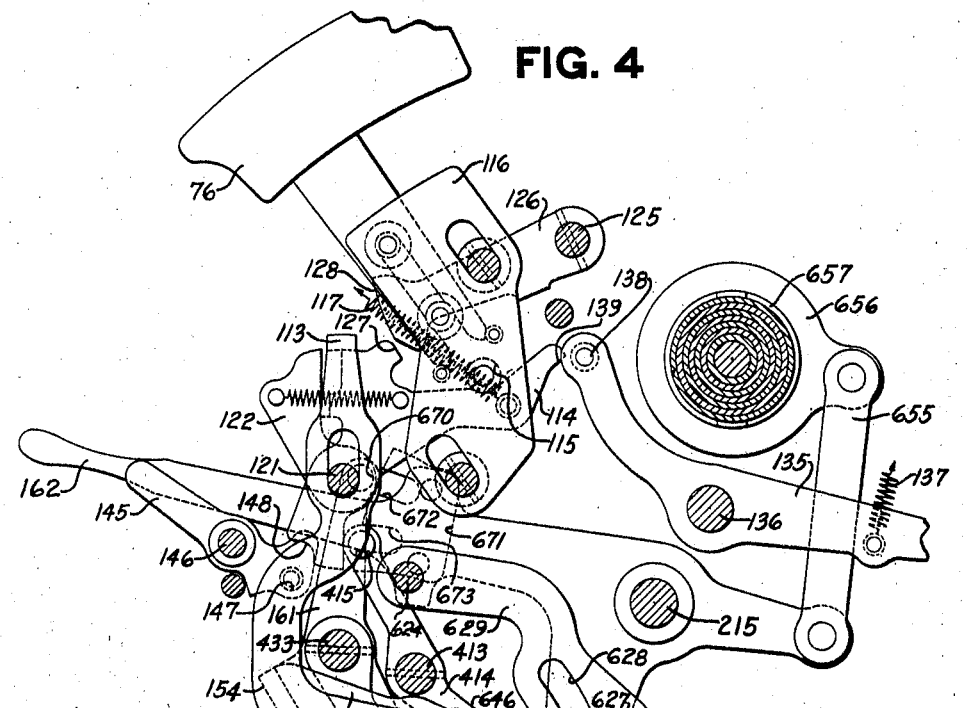
Fig. 4 is a detail view showing the total control lever and its associated mechanism, together with the motor bar and the mechanism for releasing the machine.
Figure 7:
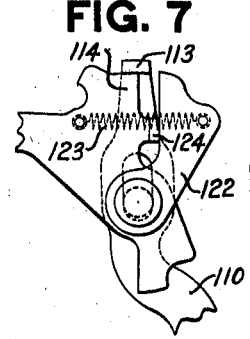
Fig. 7 is a detail view of the machine releasing pawl and the non-repeat pawl.
Figure 19:
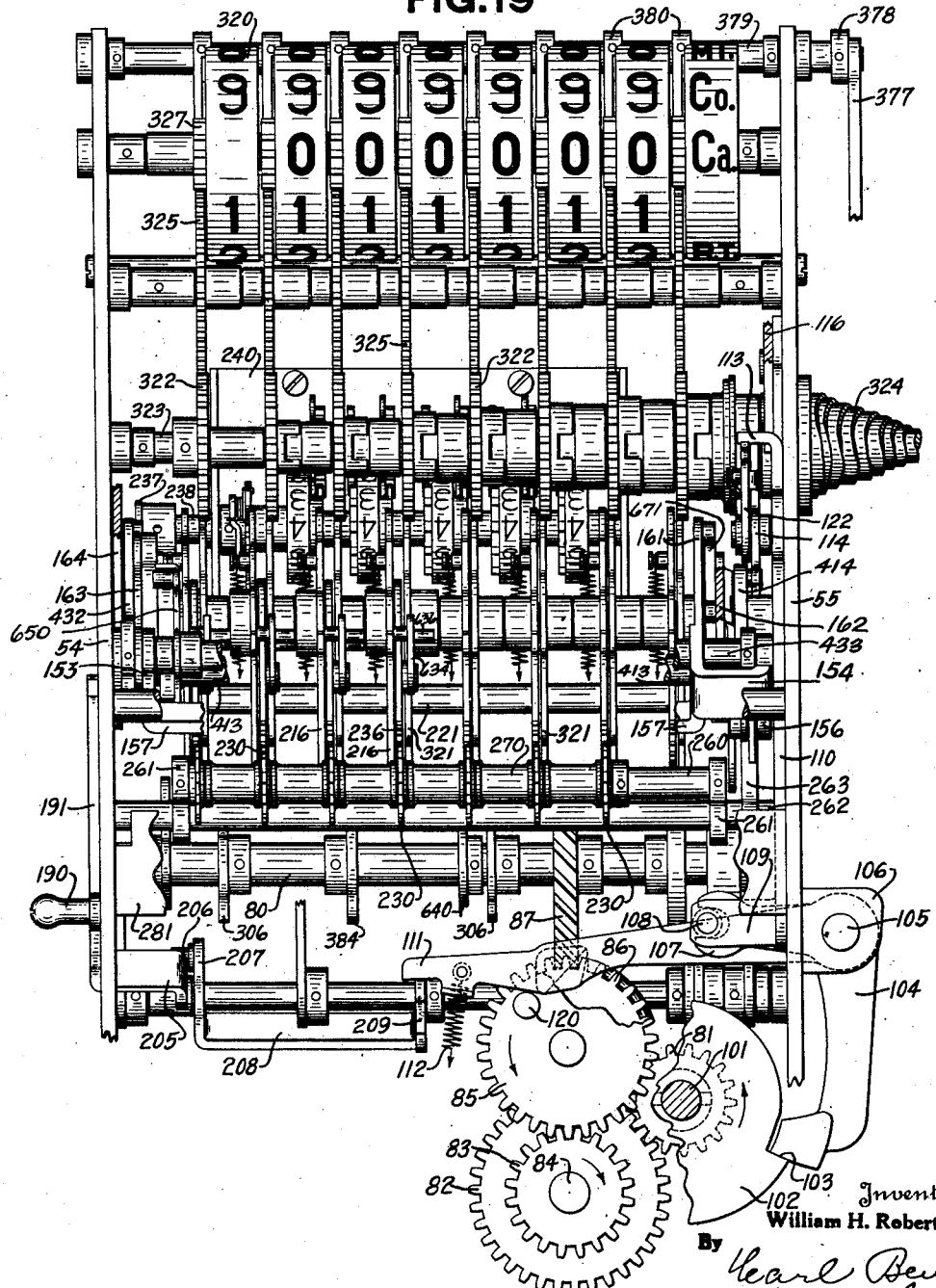
Fig. 19 is a front elevation of the machine with the cabinet and other parts removed.

The machine is released for operation by means of the motor bar 76 (Fig. 4). The above mentioned pinion 81 (Fig. 19), is loose on a stud 101, upon which is also mounted a disk 102 clutched to the pinion 81. The disk 102 has a shoulder 103, which is normally engaged by an arm 104 loose on a stud 105 mounted in two ears 106, carried by the right side frame 55. The arm 104 is clutched to a bifurcated arm 107 (see also Fig. 4) which engages a stud 108 mounted on a flange 109 on a link 110. Secured to the hub of the arm 104 is an arm 111, to which is attached a spring 112, which constantly tends to rotate the arm 111 in a counter-clockwise direction (Fig. 19). The spring 112 by means of the arm 111 and arm 107, normally tends to lower the link 110, but is prevented from doing so by a flange 113 (Figs. 4 and 7), formed on the upper end of the link 110, and normally engaging a release pawl 114, which is held, by a spring 117, against a stud 115 mounted on a slide 116. The motor bar 76 is removably mounted on two studs carried by the slide 116 and it is seen that the spring 117 normally maintains the motor bar 76 in its outer or normal position.

Depression of the motor bar 76 through the slide 116 and stud 115, will cause the pawl 114 to be rotated in a clockwise direction (Fig. 4), thereby withdrawing the pawl 114 from beneath the flange 113, and permitting the spring 112 to lower the link 110. This movement of the link 110 will cause the arm 104 to be rocked counter-clockwise (Fig. 19) and remove said arm 104 from the shoulder 103 on the disk 102, thus releasing the clutch mechanism thereby permitting the machine to begin an operation.

This releasing of the disk 102 will permit the operation of a spring-driven cam (not shown) for closing a circuit through the motor and for permitting the motor to operate. The mechanism for closing the circuit through the motor is well known in the art and is well illustrated and described in the above mentioned Kettering and Chryst patent.

The link 110 is restored to its normal position near the end of the operation of the machine by means of a stud 120 (Fig. 19) secured to the gear 85. The stud 120 engages the arm 111 and by means of the arm 107 and its connection with the link 110 will lift the link high enough to permit the pawl 114 to rock underneath the flange 113.

This movement of the arm 111 will also rock the arm 104 into the path of the shoulder 103, thereby stopping the machine.

The well known non-repeat pawl 122 (Figs. 4 and 7) is provided for preventing a second operation of the machine in case the motor bar is not permitted to return to its normal position before the end of the operation of the machine. If the operator should hold the motor bar in its depressed position as the machine completes its operation, the non-repeat pawl would be held beneath the flange 113 by a spring 123, which normally holds the pawl 122 in engagement with a flange 124 on the release pawl 114. The operation of this non-repeat pawl is well known in the art and no further description thereof will be given herein.

Motor bar lock

As above mentioned, the machine cannot be released for operation if the operator's key has not been inserted in the machine in a manner to be hereinafter described. Insertion of an operator's key will cause a shaft 125 (Fig. 4) to be rocked clockwise to the position shown. Secured to the shaft 125 is an arm 126, which lies in the path of a shoulder 127 of the pawl 114 when the operator's key is removed from the machine. Thus if the operator's key is not inserted, the motor bar 76 cannot be depressed because an attempt to do so will cause the shoulder 127 to engage a surface 128 on the arm 126. When the operator's key is inserted, the arm 126 will be rotated to the position shown, thereby moving it out of the path of the shoulder 127 and permitting depression of the motor bar.

A key lock is also provided, which is not shown herein, but which is identical with the lock for the motor bar shown and described in the above mentioned patent. The turning of the key in this lock will permit a lever 135, pivoted on a stud 136 (Fig. 4) to be rocked in a counter-clockwise direction under the influence of a spring 137. This counter-clockwise movement of the lever 135 moves a stud 138 into the path of a shoulder 139 on the pawl 114. Thus it is seen that when the stud 138 is in the path of the pawl 114, it will be impossible to depress the motor bar and therefore the machine cannot be released for operation.

A third means is provided for preventing operation of the motor bar. This means comprises a lever 145 (Fig. 4) which is pivoted on a stud 146. If the operator so desires, he may rotate the lever 145, which projects through the cabinet of the machine (see also Fig. 1), thereby raising a stud 147 into the path of a notch 148 in the pawl 114. Thus when the stud 147 is in the notch 148, it is impossible to depress the motor bar, and therefore the machine cannot be released for operation.

This lever 145 is provided to prevent accidental release of the machine by passengers on the bus. The machine will be located on the bus somewhere near the entrance and it is possible that between the time of taking on or discharging passengers, one of the passengers might accidentally depress the motor bar, thereby causing the machine to operate. By means of the lever 145, this accidental operation of the machine is prevented.

Locking detent operating means

As above mentioned, each bank of keys is provided with a locking detent 60, (Fig. 3) which is moved beneath the studs 58 of the undepressed keys and above the stud 58 of the depressed key, thereby preventing depression of a key, or the release of the depressed key, after the machine has once been released.

Mechanism for operating this locking detent is under control of the link 110 (Fig. 4). The link 110 carries a stud 155, which engages a bifurcated arm 156 of a yoke member 154 integral with an arm 161 to be later described. The yoke member 154 is also integral with a yoke member 157 which extends across, and in the rear of the lower ends of all of the locking detents 60. Each locking detent 60 is provided with a stud 158, (Fig. 3) which projects into a bifurcated arm 159 loosely mounted on a shaft 160, carried by the side frames 54 and 55. The downward movement of the link 110, upon releasing the machine as above described, will cause the yoke member 157 to rock in a clockwise direction, thereby engaging all of the arms 159, and by means of the studs 158, raising all the locking detents 60 into their locking positions.

The yoke member 157 (Fig. 4), is integral with the arm 161 for preventing operation of a total lever 162, to be hereinafter described and an arm 153 which is rigidly connected, with an arm 163, (Figs. 8 and 13) for preventing operation of a repeat release key or manipulative member 164 after the machine has been released. The arms 153 and 161 are pivotally supported on a shaft 433. This mechanism will also be hereinafter described.

Near the end of the operation of the machine, when the link 110 is restored to its home position, as before described, the yoke member 157 will return to its normal position, thereby permitting the locking detents 60 and arms 159 to return to their normal positions due to a spring 168 (Fig. 3). However, if for some reason the parts should not restore by the spring 168 to their normal or home positions, the key release mechanism to be presently described, will positively restore the locking detents and the arms 159 to their home or normal position.

The link 110 cannot be released until a key in the transaction bank is depressed. To prevent such release, an arm 165 (Fig. 11), pivoted on the shaft 160 lies in the path of the yoke member 157 when no key is depressed in the transaction bank. However, when a transaction key is depressed, the stud 58 thereon moves a releasing bar 166 downwardly, and, through its connection with the arm 165, moves said arm 165 out of the path of the yoke member 157, thus permitting the machine to release.

An arm 167 (Fig. 11) is connected to the flexible detent 57 for the transaction bank, which prevents release of the machine until the transaction key is fully depressed. Partial depression of a key will cause the flexible detent 57 to be lowered thereby rocking the arm 167 into the path of the yoke member 157. However when the stud 58 passes the hook on the flexible detent the detent will be elevated until the yoke member is again free to operate, thereby permitting release of the machine after the key is fully depressed.

Key release mechanism

Mechanism has been provided for releasing the amount and the "To" keys at the end of each operation of the machine. However, inasmuch as the "From" and "Transaction" keys are stay-down keys, this mechanism will have no effect to release these three banks of keys.

Each flexible detent 57 in the "To" and amount banks is provided with a stud 170 (Fig. 3) which normally is held against an arm 171 by the spring 59. Upon depression of a key its stud 58 will be engaged by the hook on the detent 57. In order to permit the key to release, it is necessary to lower the flexible detent 57. The arms 171 are secured to the shaft 160. Also secured to the shaft 160 (Fig. 8) is an arm 173 upon which is mounted a stud 174, which is held in contact with an arm 175, loosely mounted on a stud 176, carried by the left side frame 54. The arm 175 is provided with a stud 177 which is engaged by a pitman 178, such engagement being maintained by a spring 179. This spring 179 also assists in restoring other parts associated with the repeating operations, (later described) to their home positions in a manner to be hereinafter set forth. The pitman 178 is provided with a roller 180, which cooperates with a cam 181 secured to the main cam shaft 80. The cam 181 is so timed that near the end of the operation of the machine it will cam the pitman 178 to the left (Fig. 8), thereby rocking the arm 175 and the arm 173 for rocking the shaft 160 slightly in a clockwise direction. This movement of the shaft 160 will cause the arms 171, through the studs 170, to lower the flexible detents 57 far enough to permit the springs 56 to return the keys 50, and 67 to their normal or outer positions.

The arms 171 are wide enough to contact not only the studs 170 but also studs 185 (Fig. 3), on the arms 159, for restoring the locking detents 60 to their normal positions if they, for any reason, should happen to stick and, therefore, not be returned home by the springs 168.

Manual key releasing mechanism

It is sometimes desirable to release all of the depressed keys except those in the two left hand or "From" banks and the transaction bank, at one time, without operating the machine. In order to permit this release, a manually operable lever 191 has been provided which has a knob 190 (Figs. 8 and 19) projecting through the cabinet of the machine. This lever is pivoted on a stud 192 and has an upwardly extending arm 193, which lies in the plane of a stud 194 on the arm 173. The downward movement of the lever 191 will cause the arm 193 to engage the stud 194 thereby causing the arm 173 and shaft 160 to be rocked in a clockwise direction. This movement of the shaft 160 will cause the arms 171 to lower the flexible detents 57, thereby releasing all of the depressed keys in the amount and "To" banks.

An interlock is provided between the manual key releasing mechanism and the machine releasing mechanism, so that the machine cannot be released when the manually operable lever 191 is out of its normal position. As above mentioned, when the machine is released for operation, the yoke member 157 (Fig. 8) is rocked in a clockwise direction. Secured to the left hand end of the yoke member 157 is a rearwardly projecting arm 195, which is in the plane of a stud 196, secured to the lever 191. When the lever 191 is moved out of its home position, the stud 196 is moved into the path of the arm 195, thereby preventing movement of the arm 195 and the yoke member 157, and in this manner preventing release of the machine for operation. The stud 196 projects through a slot 197 cut in the left side frame 54, due to the fact that the lever 191 is to the left of the frame 54 (see Fig. 19), and the arm 195 (Fig. 8) is to the right of said frame. When the lever 191 is in its home position, the arm 195 can pass the stud 196 and, therefore, the machine can be released for operation.

The arm 195 is provided with a headed stud 198, which projects through the upwardly extending portion of the slot 197, the head of the stud acting as a guide for the arm 195, for holding it in positive alignment. A spring 199 secured to the lever 191 and to a stud in the frame 54 normally maintains the lever 191 in its home or normal position.

After the machine has been released, the lever 191 cannot be operated because at this time the end of the arm 195 lies in the path of the stud 196, thereby preventing movement of the lever 191.

In addition to the function of releasing the amount keys, the lever 191 has two other functions. Assuming that none of the transaction keys 69 are depressed (a condition in which the machine may be put by releasing any depressed transaction key by slightly depressing one of the other keys in that bank just far enough to cause the flexible detent 57 to release the depressed key, and then removing the finger from the slightly depressed key whereby this latter key will be restored to its normal outer position by its key spring) and that the operator or one of the passengers accidentally depresses the motor bar 76 while the lever 145 (Fig. 4) is in the position shown. This depression of the motor bar 76 under the conditions just stated, rocks the releasing pawl 114 in a clockwise direction, thus permitting the spring 112 (Fig. 19), through the connections previously described, to lower the link 110 so that its flange assumes a position between the releasing pawl 114 and the non-repeating pawl 122.

With the parts in these positions it is impossible to turn the operating handle, since the slight downward movement of the arm 111 (Fig. 19) is not sufficient to permit the arm 104 to be removed from the shoulder 103 of the motor locking disk 102, due to the fact that the arm 165 (Fig. 11) has not been moved from in front of the yoke member 157.

Moreover, the yoke member 157 is firmly held against the end of the arm 165 by the spring 112, thus producing sufficient friction to prevent the arm 165 from moving away from said member 157, thereby holding the parts in partially released positions.

It will be recalled that this yoke member 157 is connected to the link 110 by means of the arm 156 and pin 155, consequently, the slight downward movement of the link 110 just above mentioned, and also the clockwise movement of the yoke member 157, is stopped by the contact of the member 157 with the end of the arm 165, there being a slight clearance between said arm 165 and member 157.

Figure 18:
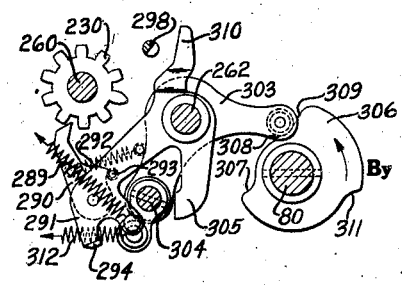
Fig. 18 is a detail view of the cam for operating the transfer mechanism.

Now, in order that the machine may be operated and the motor bar 76 and link 110 released so that they may assume their normal positions, it is necessary that the operator rock the lever 191 counter-clockwise (Fig. 8) by means of the knob 190. This movement of the lever 191, by means of an arm 205 connected thereto, rocks an arm 207 through the contact of the arm 205 with a stud 206 on the arm 207. This arm 207 is connected by a yoke 208 to an arm 209 (Figs. 8 and 19). The arm 209, therefore, receives a clockwise movement (Fig. 18) by the counter-clockwise movement of the lever 191. As clearly shown in Fig. 19, the arm 209 rises beneath the arm 111, and consequently rocks this latter arm in a clockwise direction and moves the arm 104 clockwise to its normal position.

Through the connections illustrated in Fig. 4, the clockwise movement of the arm 111 raises the link 110 to its normal position whereby the flange is moved above the releasing pawl 114, whereupon the spring 117 immediately restores the motor bar 76 to its normal position. The upward movement of the link 110 also rocks the yoke member 157 counter-clockwise to its normal position.

The other function of the lever 191 is to release, not only the motor bar 76, but also one of the transaction keys 69 should this key be partly depressed and the motor bar depressed. A partial depression of one of the keys 69 (the operator holding the key in such partly moved position), followed by a depression of the motor bar 76, also causes the flange 113 (Figs. 3 and 7) to assume a position between the releasing pawl 114 and the non-repeating pawl 142. The downward movement of the link 110 also causes the yoke member 157 (Fig. 11) to be rocked in a clockwise direction, but this time it rocks slightly farther than during the last above described movement of the member, because the partial depression of one of the keys 69 moves its flexible detent 57 downwardly, thus rocking the arm 167 in a clockwise direction from the position shown in Fig. 11 to a position in front of, or to the left (Fig. 11) of the yoke member 157. At the same time the arm 165, through the releasing bar 166, is moved below the yoke member 157. The arm 167, being slightly shorter than the arm 165, allows the yoke member 157 to receive a slightly greater movement than it did when stopped by the arm 165. However, even this movement is not sufficient to allow the arm 104 (Fig. 19) to be removed from the shoulder 103 of the motor locking disk 102, and consequently, the machine will not be released. The parts are held in partially released positions by the friction between the arm 167 and yoke member 157, which friction is produced by the spring 112.

It is again necessary that the operator restore the motor bar 76 to its normal position, and also restore the partially depressed key 69 to its normal position. (At certain times when the key 69 is partially depressed, it will remain depressed, and at other times it will snap out of its normal position. In either event, the machine cannot be released, and if the key does stay partially depressed, it is because of friction that it is so held.) The counter-clockwise movement of the lever 191 through the arm 205 previously described, rocks the arm 209, and consequently, raises the arm 111, thus moving the arm 104 clockwise to the position shown in Fig. 19, and, as above described, (in connection with the other operation wherein only the motor bar was depressed) the movement of the arm 111 through the connection shown in Fig. 4 raises the link 110, so that its flange assumes the position shown, above the releasing pawl 114 and non-repeating pawl 122, whereupon the spring 117 immediately restores the motor bar 76 to its normal position. The raising of the link 110, as above described, rocks the yoke member 157 counter-clockwise, thus releasing the friction against the end of the arm 167 and permitting the detent 57 to be restored to its normal position, and camming the key 69 to its normal position, if the same has remained in the partially depressed position due to the friction between the parts.

There is still a third condition under which the motor bar might be depressed and not release the machine, and that is, where someone should deliberately rock the lever 191 clockwise until the arm 209 was in a position just slightly beneath or just touching the arm 111 and then depress the motor bar. In this case, the link 110 would also be lowered and its flange 113 assume a position between the releasing pawl 114 and non-repeating pawl 122, but the arm 104 could not be rocked far enough to remove its lower end from the shoulder 103 of the motor locking disk 102, consequently, the machine could not be released under these conditions. All that it is necessary to do now, is for the operator to rock the lever 191 to complete its full movement so as to raise the arm 209 sufficiently to rock the arm 111 and raise the link 110, so that its flange 113 again assumes a position (shown in Fig. 4) above the releasing and non-repeating pawls 114 and 122 respectively.

Differential mechanism

The differential mechanisms for all the banks excepting the four left hand or station banks are identical, and therefore only one of the differential mechanisms will be described herein. This differential mechanism is of the spring actuated type; that is, the type in which the actuator is adjusted under the influence of a spring, the differential movement thereof being controlled by the depressed key.

Carried by the side frames 54 and 55 is a rod 215 (Fig. 3). Pivoted on the rod 215 is an actuator 216 provided with teeth 217 and a forwardly extending arm 218. The actuator 216 has secured thereto a stud 219, to which one end of a spring 220 is connected, the other end of said spring being connected to a rod (not shown) carried by the side frames 54 and 55. The spring 220 normally tends to rock the actuator 216 in a clockwise direction but is prevented from doing so by a universal rod 221, Figs. 3, 9 and 19 carried by a pair of arms 222. The arms 222 are secured on the rod 215. One of these arms, that one shown in Fig. 3, is adjacent the left side frame 54, and the other arm 222 is located adjacent the right side frame 55. Secured to the left hand arm 222 (Fig. 9) is a disk 223 having teeth thereon meshing with a segment 224 pivoted on a stud 225 carried by the left side frame 54. The segment 224 has mounted thereon a pair of rollers 226, which co-operate with a pair of cam plates 227 secured to the main cam shaft 80.

When the cam shaft 80 is rotated during the operation of the machine the segment 224 will rock the arms 222, first in a clockwise direction (Fig. 3) thereby permitting the actuator 216 to be rocked under the influence of the spring 220 until stopped by the end of the depressed key, unless it is prevented from doing so by the zero stop pawl 62. The rod 221 is adapted to move far enough to permit nine steps of movement of the actuator 216, but if the actuator is stopped by the depressed key or by the zero stop pawl 62 before it reaches the nine key the rod 221 will move on idly.

After the actuator 216 has been positioned under control of one of the keys 50, and the rod 221 has finished its clockwise movement, a totalizer pinion 230 will be engaged with said actuator 216 in a manner to be hereinafter described. After the totalizer pinion has been engaged with the actuator 216, the segment 224 (Fig. 9) will be rocked counter-clockwise by the cam plates 227, thereby causing the rod 221 to be moved back in a counter-clockwise direction, which movement will carry the actuator 216 back to its home position. This backward movement of the actuator 216 will add an amount on the totalizer pinion commensurate with the value of the key depressed.

A stop is provided to prevent overthrow of the arms 222 and the universal rod 221 (Fig. 9). The arm 222, which is adjacent the left side frame 54, is provided with a surface 231 which contacts a stud 232 on the left side frame 54, when the arm 222 is in its normal position. A surface 233 engages the stud 232 when the arm 222 is rocked to its extreme moved position thereby limiting its movement. Thus the stud 232 limits the movements of the arms 222 and rod 221 in both directions,

Transaction bank differential mechanism

An actuator 216 is also provided for the transaction bank, but this actuator is only used for the purpose of adjusting the type carriers and indicators in a manner to be hereinafter described. It is sufficient to say here that there is no totalizer pinion 230 associated with the actuator 216 for the transaction bank.

"To" and "From" or station bank differential mechanism

Figure 16:
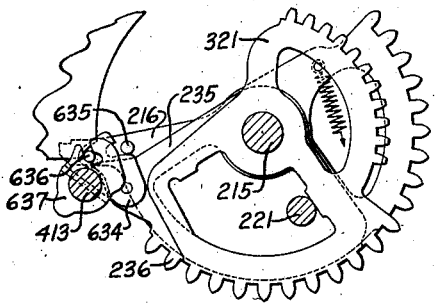
Fig. 16 is a detail view of the differential mechanism in the four left hand or "From" and "To" banks.

The four left hand banks, that is, the "To" and "From" banks are also provided with actuators 216 (see Fig. 16). However, as in the transaction bank, these banks do not add into the totalizer, but are used merely for setting the type carriers and indicators. However, totalizer pinions have been provided adjacent to these four banks (Fig. 19), for the purpose of printing the higher order amounts from the totalizers when printing totals. But since these banks do not add into the totalizer pinions, their actuators are not provided with the section of teeth 217 which on the amount actuators enter amounts in the totalizer.

A segment 235 (Fig. 16), having teeth 236, co-operates with each of the totalizer pinions in the four higher order banks during a total taking operation, in a manner to be hereinafter described. However, during adding operations the segments 235 do not move, and therefore they are ineffective for actuating the totalizer pinions.

Special counters

The usual form of step-by-step counter is provided for counting the number of times the machine is operated. This type of counter is old and well known in the art, and therefore only a brief description thereof will be given herein.

Mounted on the disk 223 is a stud 234 (Fig. 9) which enters a bifurcated arm 237 secured to a shaft 238 (see also Fig. 19) carried by flanges 239 (Fig. 3) of a bracket 240. The bracket 240 is secured to a back frame 241 of the machine and adjacent to an opening 242 in the frame 241. Also secured to the shaft 238 is an arm 243, (Fig. 9) which has pivoted thereto a pawl 244 adapted to be held in engagement with a ratchet wheel 245 by means of a spring 246. The ratchet wheel 245 is connected to the units counter wheel by means of a sleeve 247.

It will be remembered that the disk 223 is given a clockwise and counter-clockwise movement during each operation of the machine. This movement of the disk 223 will rock the arm 237, and by means of shaft 238 will rock the arm 243 first counter-clockwise and then clockwise. The clockwise movement of the arm 243 will cause the ratchet wheel 245 to be rotated one step by means of the pawl 244 thereby adding one into the units wheel of the special counter.

The well known Geneva transfer mechanism shown in Fig. 3 is provided for transferring "1" to the next higher order when the lower order wheel passes from 9 to zero. Each counter wheel is provided with a long tooth 248, which engages a gear 249 as the wheel is passing from nine to zero, by means of which one step of movement will be transferred to the counter wheel of the next higher order element. A locking plate 250 is provided which co-operates with a locking disk 251 on the counter wheels, and prevents rotation of the counter wheels except when a transfer is being effected.

It is necessary to read the counter from the rear of the machine and for this reason the bracket 240 is provided with an opening (Fig. 3) for displaying the number on the special counter.

Totalizers

Figure 6:
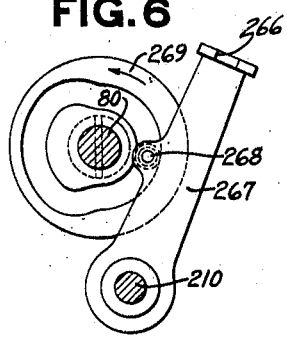
Fig. 6 is a detail view of the cam for engaging the totalizer with and for disengaging it from the actuators during adding operations.

The totalizer pinions 230 are all supported on a shaft 260 (Figs. 3 and 4) supported by two arms 261 (see also Fig. 19). The arms 261 are secured to a shaft 262, carried by the side frames 54 and 55 of the machine. Also secured to the shaft 262 is an arm 263 having pivoted thereto a link 264. The link 264 is provided with a stud 265, which is adapted to be held within a notch 266 (Fig. 6) of an arm 267 during adding operations in a manner to be hereinafter described. The arm 267 is provided with a roller 268 which projects into a cam race in a cam disk 269. The cam race in the disk 269 is so timed that during the operation of the machine the totalizer pinions will be engaged with and disengaged from the actuators 216 at the proper time. The totalizer pinions 230 are held in lateral alinement on the shaft by means of spacing collars 270 (Fig. 19).

An alining device is provided for maintaining the totalizer pinions in proper alinement when they are disengaged from the actuators 216. Secured to the shaft 262 (Fig. 3) adjacent to each of the totalizer pinions 230 is an arm 275 having pivoted thereon an aliner 276. The aliner is held by a spring 278, in contact with a stud 277 carried by the arm 275. The stud 277 is so located as to permit the nose of the aliner to be in engagement with its totalizer pinion 230 when the totalizer is disengaged from the actuator 216. As the totalizer moves into engagement with the actuators, the arms 275, being fast on the shaft 262, are rocked clockwise, carrying the aliners 276 along until the tails 279 of the aliners strike a flange 280 formed on a plate secured to a cross bar 281, thus causing the aliners to be rocked far enough to disengage their noses from the totalizer pinions.

As the totalizer becomes disengaged from the actuators and the tails 279 are withdrawn from the flange 280, the springs 278 will again rock the aliners 276 into engagement with the totalizer pinions, thereby holding them in alinement. These parts are so arranged that the aliners are disengaged from the totalizer pinions at the time the totalizer pinions begin to engage the actuators 216 and again engage the totalizer pinions just before they become entirely disengaged from the actuators.

A spring actuated aliner 282 is provided for alining the totalizer frame when the totalizer is in its engaged position. This aliner is held, by a spring 284, against a stud 283 carried by one of the arms 275. As the totalizer becomes engaged, the stud 283 becomes disengaged from a surface 285 on the aliner, thereby permitting the spring 284 to rock a cam portion 286 of the aliner into engagement with the stud 283, thus camming the totalizer frame into position to cause the pinions 230 to properly engage the teeth 217 of the actuators.

Transfer mechanism

A transfer mechanism has been provided in the totalizer for carrying one to the next higher order pinion when the lower order pinion passes from 9 to zero. A transfer carrying pawl 290 (Figs. 17 and 18), is pivoted on an arm 291 and is held by a spring 292 in its normal position against a stud 293 on the arm 291. The arm 291 is loosely pivoted on the shaft 262 and normally tends to rock in a clockwise direction (Fig. 18) under the influence of a spring 289, but is prevented from doing so by a flange 294 formed on the arm 291, which engages a downwardly extending arm 295 (Fig. 17) of a bell crank 296. One end of the spring 289 is attached to a stud on the arm 291 and the other end is attached to a spring hook 288 (Fig. 3). These spring hooks, one for each order of the totalizer, are formed alternately with the flanges 280. The bell crank 296 normally tends to rock in a clockwise direction due to a spring 297, but is prevented from doing so by a stud 298, engaging a shoulder on a transfer trip pawl 300. The trip pawl 300 is pivoted on the arm 275, which is secured to shaft 262. The shoulder on the pawl 300 is held in engagement with the stud 298 by means of a spring 301, one end of which is attached to a stud on the trip pawl 300 and the other to a stud on the arm 275.

When the totalizer element of lower order passes from 9 to zero, its long tooth 302 (Fig. 17) engages the trip pawl 300, thereby disengaging the shoulder on the pawl 300 from the stud 298 and permitting the spring 297 to rock the bell crank 296 far enough to disengage the arm 295 from the flange 294. The disengagement of the arm 295 from the flange 294 will permit the arm 291 for the next higher order to be released for carrying one into said next higher order totalizer pinion 230. However, at this time, the totalizer is engaged with its actuators, as above described, and therefore the totalizer pinion of next higher order will not be in position to be engaged by the carrying pawl 290. For this reason means must be provided for delaying the action of the arm 291 until the totalizer is disengaged from the actuators. To accomplish this, two arms 303 pivoted on the shaft 262 have been provided, which carry a rod 304 extending across the path of a downwardly extending arm 305 on each of the arms 291. Each arm 303 is provided with a roller which is held in engagement with a cam 306 (Figs. 18 and 19), on the main cam shaft 80, by means of a spring 312.

At the beginning of the operation of the machine a rise 309 on each cam 306 will cause the arms 303 to be rocked far enough to cause the rod 304 to engage the downwardly extending arms 305 and to rock them in a counter-clockwise direction for restoring all of the transfer trip pawls which were tripped during the previous operation. Upon further rotation of the cams 306, a drop 311 on each cam permits the arms 303 to move back toward normal positions to permit the transfer trip pawls to be tripped in a manner to be presently described. After all the pawls which are to effect a transfer have been tripped, and after the totalizer has been disengaged from the actuators, a second drop 307 of the cams 306 will permit the arms 303 to rock in a clockwise direction to permit the rod 304 to move away from the arms 305, thus allowing the tripped carrying pawls to effect the transfer.

From the above it will be seen that all of the carrying pawls which are tripped during the entry of the items will be moved simultaneously to effect the transfer in the various orders. However, if there is to be a transfer upon a transfer, as for example, when all the higher order wheels are standing at "nine" and one is carried into the lower order, then the transfers will be effected one after the other. When a transfer is effected after the rod 304 has been moved away from the arms 305 and the pinions into which the transfer is carried turn from "nine" to "zero", the long tooth 302 will trip the pawl 300 to permit the bell crank 296 to become disengaged from the flange 294, thereby permitting the arm 275 to move under the action of the spring 289 to effect the transfer in the next higher order.

At the end of a transfer movement of the carrying pawl 290, the pawl is in engagement with the tooth on the totalizer pinion into which the transfer has been carried. Each cam 306 is provided with a rise 308, which will withdraw the pawl 290 from engagement with the tooth, just at the end of the operation of the machine, so that the liner 276 can accurately line up the pinions.

Figure 17:
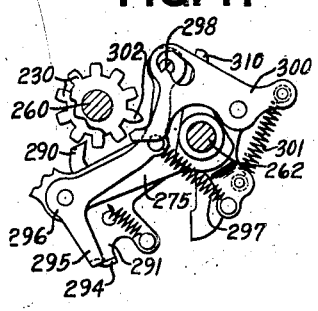
Fig. 17 is a detail view of a part of the transfer mechanism.

The arms 291, which are tripped for effecting transfers, will not be restored until the beginning of the next operation. At the beginning of the operation of the machine, the rise 309 (Fig. 18) of the cams 306 will rock an upwardly extending finger 310 on the arm 291 into engagement with the stud 298. Since the bell crank 296 (Fig. 17), is carried by the arm 275, it will be seen that when the totalizer engages its actuators, the stud 298 will be rocked toward the finger 310 of the arm 291. It is this engaging movement of the totalizer with its actuators that causes the stud 298 on the bell crank 296 to be restored back to engagement with the shoulder on the transfer trip pawl 300, as shown in Fig. 17. The upwardly extending finger 310 merely acts as a stop, and the engaging movement of the totalizer causes the stud 298 to be shifted back behind the shoulder.

After all the transfer carrying pawls are restored, as just described, it is necessary to move the finger 310 from engagement with the stud 298 so that the arm 295 will be free to rock when the transfer trip pawls 300 are released. The drop 311 on each cam 306 is provided for permitting the arms 303 to rock far enough clockwise to disengage the finger 310 from the stud 298.

*Indicators*

As shown in Figure 1, the machine is provided with a series of indicators 320, for indicating the data printed on the ticket and detail strip, and also the amount entered into the totalizer. The indicators disclosed herein are of a type which is first restored to zero position and then set up according to the amount of differential movement given to the totalizer actuators.

Each indicator is adjusted by a segment 321 (Fig. 3) loosely mounted on the rod 215, and meshing with a gear 322. One of the gears 322 is secured to the end of a shaft 323 and one is secured to the end of each sleeve 324. Each gear 322 meshes with a gear 325, which is loosely mounted on a rod 326 carried by the side frames 54 and 55. The gear 325 meshes with a pinion 327 secured to the indicator 320. When the rod 221 moves forward for setting the actuator 216, the rod will engage a surface 329 on the segment 321 and move the segment far enough in a clockwise direction to return the indicator 320 to its zero position. In this position the gear 325 will be stopped by a rod 330. The rod 330 passes through slots cut in the gears 325 and acts as a positive stop for the indicators when they reach their zero positions.

A coupling pinion 340 (Figs. 3 and 14) is provided for each differential mechanism for coupling the actuator 216 with the segment 321. The coupling pinion 340 is normally in mesh with the actuator 216 and with the segment 321, but at the beginning of the operation of the machine the pinion is disengaged therefrom long enough to permit the actuator 216 to be adjusted under control of the depressed key and for permitting the rod 221 to restore the segment 321, as above described. After the actuator 216 has been adjusted, the coupling pinion 340 is again engaged with the actuator 216 and segment 321 and the actuator is then returned to its home position. This return movement of the actuator will be transmitted to the indicator 320 by the segment 321 and the train of gears above described. Thus the indicator is set commensurate with the value of the key depressed.

Three separate means have been provided for disengaging the coupling pinions 340 from the actuators and segments 321 and engaging the coupling pinion therewith. All three of these means operate at the same time during adding operations, but during repeat operations they function differently. The method of functioning during repeat operations will be hereinafter more fully described. One of these means has been provided for engaging and disengaging the coupling pinions for the three amount banks and the "To" banks. A separate means is provided for the two higher order or "From" banks, and another means for controlling the movement of the coupling pinion for the transaction bank. However, all of these means are operated from the same cam during adding operations as will now be described.

Figure 14:
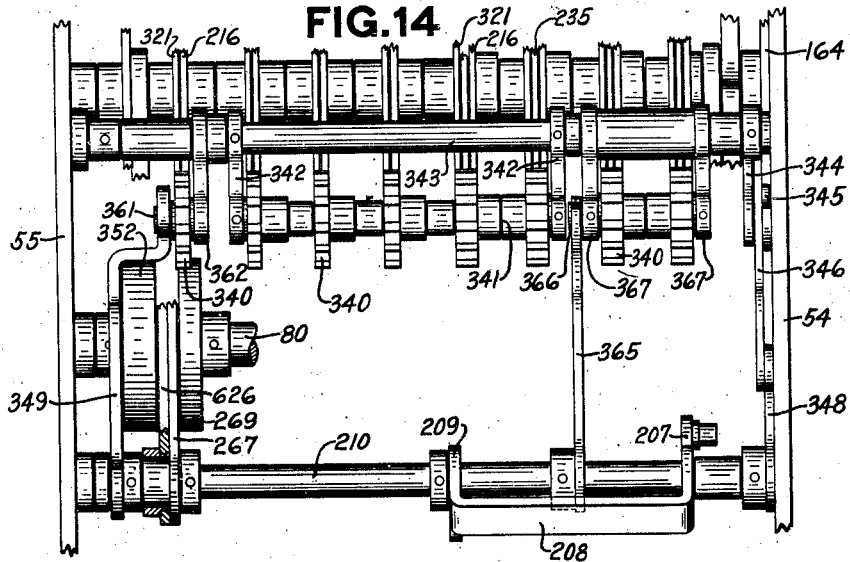
Fig. 14 is a rear elevation of the totalizer engaging and disengaging mechanism together with a part of the repeat mechanism.

The coupling pinions for the amount and "To" banks are all loosely mounted on a rod 341 (Figs. 3, 8 and 14), carried by two arms 342, secured to a shaft 343. Also secured to the shaft is an arm 344 (Figs. 8 and 14). The arm 344 is provided with a stud 345, which enters a notch in a link 346 guided at its upper end by a stud 347, which projects into a slot 353 in the repeat release key 164. The lower end of the link 346 is pivoted to an arm 348 secured to the shaft 210. Secured to the shaft 210 is an arm 349 (Figs. 14 and 15) provided with a roller 350 which projects into a cam groove 351 in a cam disk 352. The cam disk is secured to the main cam shaft 80.

At the beginning of an operation of the machine, the cam 351 will rock the shaft 210 and arm 348 (Fig. 8) by means of the arm 349, thereby lowering the link 346. The lowering of the link 346 will rock the arm 344 and shaft 343 in a counter-clockwise direction thereby rocking the arms 342 counter-clockwise far enough to disengage the pinions 340 from the actuators 216 and the segments 321, for the amount and the "To" banks.

The coupling pinion 340 for the transaction bank is disengaged directly by means of the arm 349, above mentioned. The arm 349 is provided with a hook-shaped end 360, (Figs. 14 and 15), which engages a stud 361, upon which the coupling pinion 340 for the transaction bank is mounted. Stud 361 is secured to an arm 362, loosely mounted on the shaft 343. As the cam disk 352 rotates, the arm 349 will be rocked, as above mentioned, thereby rocking the coupling pinion 340 from engagement with the segment 321 and actuator 216.

A clearance is provided between the arm 349 and the stud 361 so that the arm will receive an idle movement before it engages the stud 361. This is necessary because the arm 349, which is also used for engaging the totalizer, has more movement than is necessary for disengaging the pinion 340.

The coupling pinions 340 for the "From" banks are controlled by means of an arm 365 (Figs. 14 and 15) secured to the shaft 210. The arm 365 is bifurcated to engage a rod 366 upon which the coupling pinions 340 for the "From" banks are mounted. The rod 366 is carried by a pair of arms 367, sleeved together and loosely mounted on the shaft 343. Thus when the shaft 210 is rocked to disengage the coupling pinions 340 for the amount banks, as above described the arm 365 will disengage the coupling pinions for the "From" banks.

A clearance is provided between the arm 365 and the rod 366 so that the arm 365 will receive an idle movement before it engages the rod 366. This is necessary because the arm 365 is operated by the same cam which operates the arm 349 for engaging the totalizer, and which receives a greater movement than necessary for disengaging the pinions 340.

As seen in Fig. 14, the coupling pinions 340 for the "To" and "From" banks are wider than those in the amount and transactions banks. This is necssary because in the "To" and "From" banks the segment 235 (Fig. 16) is located between the actuator 216 and segment 321, thus spacing them farther apart than in the amount and transaction banks.

*Coupling pinion alining device*

In order to keep the coupling pinions 340 in proper alinement when they are disengaged, so that upon subsequent engagement they will properly mesh with the actuators 216 and segments 321, an aliner 368 (Fig. 3) has been provided. When the pinions become disengaged from the actuators 216 and segments 321, they engage the aliner 368 thereby holding them against rotation. The aliner is secured to the back frame 241 of the machine.

*Indicator alining devices*

In order to maintain the indicators in their adjusted positions, alining devices have been provided which are rocked into engagement with the pinions 327 on the indicators, after the indicators have been adjusted.

The indicator aliners are operated by a cam race 376 in a disk 370 (Fig. 24), which is secured to an auxiliary cam shaft 371. The cam shaft 371 is driven by means of the idler gear 99 (Fig. 26) which meshes with a gear 372 on the shaft 371. The gear 372 is of the same diameter as the gear 100 on the main cam shaft 80, and therefore the shaft 371 will receive one rotation for each rotation of the main cam shaft 80.

Secured to a shaft 373 (Fig. 24) is a lever 374, provided with a roller 375, which projects into the cam race 376 in the disk 370. Pivoted to the lever 374 is a link 377 the upper end of which is pivoted to an arm 378 (Fig. 23), secured to a shaft 379. The shaft 379 has secured thereon an aliner 380 for each indicator. (See also Figs. 3 and 19.) At the beginning of the operation of the machine, the cam race 376 will cause the lever 374 to be rocked to lower the link 377, thereby disengaging all of the aliners 380 from the pinions 327. After the indicators have been adjusted, as above described, the cam race 376 will again cause the aliners 380 to be rocked into engagement with the pinions 327, thereby holding them in alinement until the next succeeding operation.

*Actuating aligning devices*

An alining device has been provided for properly alining the actuator 216 and the segment 321. An alining pawl 381 for each actuator 216 and segment 321 (Fig. 3), which is wide enough to engage both the actuator 216 and the segment 321, is secured to a shaft 382 carried by a bracket on the back frame 241. One of the alining pawls 381 has mounted thereon a roller 383 which is held in engagement with a cam 384 on the main cam shaft 80, by means of a spring 385. The spring is attached to an arm 386, secured to the shaft 382.

The cam 384 is so timed that the alining pawls 381 move out of engagement just before the rod 221 moves forward to permit the actuators 216 to operate. Just before the totalizer engages, the alining pawls are reengaged with the actuators and segments to properly aline them, but are again disengaged before the actuators and segments are returned by the rod 221. After the actuators and segments have been properly restored the aliners are again engaged to prevent movement of the actuators and segments.

Type carriers

As above mentioned, the shaft 323 (Fig. 3) and each sleeve 324, have secured on their left hand ends gears 322, which are adjusted according to the differential movements of the actuators 216. The other ends of the sleeves 324 and the shaft 323, have secured thereon gears 390 (Fig. 24) each of which meshes with a pinion 391 secured to a type carrier 392. Thus it is seen that the differential movements of the actuators 216 will be transmitted to the type carriers 392. There is a type carrier provided for each bank of keys, and therefore the data set up on the keyboard will be set up on the type carriers 392. All of the type carriers 392 are loosely supported on a rod 393.

The type carriers 392 are provided for taking impressions on a detail strip, which will be hereinafter described. There is another set of type carriers 394 (Fig. 24) provided for printing the data on the tickets issued from the machine. These type carriers 394 are all loosely mounted on a shaft 395 and have secured thereto pinions 396 which mesh with idler gears 397, loosely mounted on a rod 398. The gears 397 mesh with the gears 390, and therefore the type carriers 394 will receive the movements from the actuators 216 in the same manner as the type carriers 392.

Type carrier aliners

A device has been provided for properly alining the type carriers after they have been adjusted by the differential mechanism. This device consists of a yoke 399 (Figs. 24 and 28) having an alining tooth 400, which projects across all of the gears 390, and is adapted to engage between the teeth thereof. The yoke 399 is secured to the shaft 373 and is actuated by the cam race 376 in the disk 370 in the same manner as described for the indicator alining devices.

Repeat release key mechanism

The repeat mechanism provided in this machine is characterized by the fact that the operator need not know at the time of making the original entry that the amount is to be repeated. A previous amount can be repeated at any time after the operation is completed, so long as no other keys have been depressed in any of the amount banks. In repeat mechanisms heretofore known in the art, it is usually necessary to make a preliminary setting before the original amount is entered, in order that the amount may be later repeated. This preliminary setting is entirely unnecessary in the present invention. This type of repeat mechanism is particularly useful in the system to which it is adapted herein because the operator on the bus sets up and prints the tickets as the passengers are boarding the bus. Any number of passengers may require tickets for the same destination and therefore the passengers can be more speedily served by a special repeat mechanism such as has been provided herein. All that the operator need do is to glance at the indicators, and if they show the same amount as that which is to be printed on the next ticket, all he need do is to press the repeat release key and the machine will be released and issue a ticket. However, it is apparent that the repeat mechanism is useful in a great many other lines of business and it is not desired to limit it to this particular system.

It will be remembered that the segment 321 (Fig. 3) is left standing, at the end of the operation of the machine, in the position to which it was adjusted under control of the depressed key, and that the actuator 216 is always restored to its home position. During repeat operations the segment 321 and the gears 322 and 325, together with the rod 330, are used for controlling the positioning of the actuator 216. During repeat operations none of the keys 50 or 67 (Fig. 1) is depressed and therefore the actuators 216 will move up until stopped by some other means than the keys. This means consists of the rod 330, which stops the gear 325 and by means of the gear 322 stops the segment 321 in its zero position, as above described. Depression of the repeat release key or manipulative member 164 (Fig. 8) will disconnect the link 346 from the stud 345, and therefore when the machine starts to operate, the coupling pinions 340 will not be disengaged from the actuators 216 and the segments 321. A notch 401, cut in the lower end of the key 164, will engage the stud 345, thereby holding the arm 344 and pinions 340 in positive alinement when the repeat release key or manipulative member is depressed. Thus when the rod 221 (Fig. 3) receives its forward movement to restore the segments 321 to their zero positions, the actuators 216 will be moved a like distance, thereby setting up in the actuators the amount previously standing on the segments 321. During the return movement of the rod 221, the coupling pinions will still remain engaged with the actuators and segments, and therefore the actuators 216 will be returned to their home positions and the segments 321 will be returned to the positions in which they were standing at the beginning of the repeat operation.

During the repeat operation, the totalizer is engaged and disengaged from the actuators 216 at the same time as during an ordinary adding operation, and therefore, the amount previously standing on the segments 321 will be again added into the totalizer pinions. Simultaneously, the indicators and type carriers will be adjusted in the same manner as before described for an ordinary adding operation.

The means for disconnecting the link 346 from the stud 345 consists of the slot 353 through which the stud 347 projects. Depression of the key or manipulative member 164, by means of the stud 347, will rock the link 346 in a clockwise direction until it becomes disengaged from the stud 345.

By referring to Fig. 14 it will be seen that the disconnection of the link 346 from the stud 345 will only prevent disengagement of the coupling pinions 340 for the three amount banks and for the two "To" banks. The transaction bank and the "From" banks will be controlled by depressed keys during repeat operations in the same manner as during regular adding operations. It is necesary to have a key in the transaction bank in depressed position before the machine can be released for operation, and for this reason a key will always be in position to control the differential of the transaction bank during repeat operations. The keys in the "From" banks and in the transaction bank are stay-down keys, that is, at the end of the operation these keys will not be released as in the case of the amount banks. For this reason a key will be in depressed position in each of the "From" banks during repeat operations and will therefore control the differential movement of the actuators in the "From" banks during repeat operations. Thus it is seen that the differentials in the "From" and "Transaction" banks are controlled by keys during repeat operations instead of by means of the gears 322, 325 and rod 330 as the amount banks are.

It is not necessary to depress the motor bar 76 to release the machine for a repeat operation. The repeat release key or manipulative member 164 is adapted to release the machine, and for this reason all that is necessary for a repeat operation is to depress the key or manipulative member 164. Depression of the key or manipulative member 164 will cause a stud 410 (Fig. 8), to be moved into a slot 411 of an arm 412, secured to a shaft 413. The slot 411 is so formed that when the stud 410 enters therein, the arm 412 together with the shaft 413 will be rocked counter-clockwise. The counter-clockwise movement of the shaft 413 rocks an arm 414 (Figs. 4 and 13), secured to the shaft, counter-clockwise far enough to cause a stud 415 on said arm 414, to strike the lower end of the release pawl 114 and rock said pawl 114 clockwise thereby disengaging it from the flange 113 on the link 110 so as to release the machine in identically the same manner as the depression of the motor bar 76 releases the machine as previously described.

The arm 412, shaft 413 and arm 414 are held in normal positions by means of a coiled spring 416 (Figs. 8 and 13). The spring 416 is coiled around the hub of the arm 412 and each end bears against the stud 417 carried by the arm 412. The extreme ends of the spring 416 also normally bear against a stud 418 mounted in the left side frame 54 of the machine. When the stud 410 on the repeat release key 164 cams the arm 412 counter-clockwise, the spring 416 will be tensioned and the right hand end of the spring will be held against the stud 418. Upon release of the repeat release key or manipulative member, the left hand end of the spring 416, bearing against the stud 417, will cause the arm 412 to be returned to its normal position and the spring will again engage the left hand side of the stud 418.

The arm 412 is also adapted to be rocked in a clockwise direction by means of the total lever 162 in a manner to be hereinafter described. When the arm 412 is rocked clockwise, the spring 416 is tensioned, and its left hand end is held against the stud 418. When the total lever 162 is returned to its adding position, the right hand end of the spring 416, bearing against the stud 417, will restore the arm 412 to its normal or home position.

A spring 419 is provided for maintaining the repeat release key in its normal or home position. This spring 419 restores the repeat release key 164 to its normal position during a repeating operation and also assists in restoring other parts, to be later described, to their home positions. A stud 420 secured to the left side frame 54 provides a stop for the repeat release key, thereby limiting the movement thereof under the influence of the spring 419. A stud 421 also secured to the left side frame 54 provides a stop for limiting the downward movement of the repeat release key or manipulative member 164 when it is depressed to release the machine.

When the arm 412 is rocked clockwise under the influence of the total lever 162 (to be hereinafter described) the upper surface 422 of said arm 412 is rocked beneath the stud 410, thereby locking out the repeat release key after the total lever has been moved out of its add position.

As previously described, during a repeat operation the differentially movable actuator 216, for each amount bank and for each of the "To" banks is moved under control of the segment 321. For this reason it is necessary to rock the zero stop pawls 62 for these banks out of their effective positions during repeat operations. As above mentioned, when an amount key is depressed, its associated zero stop pawl 62 is moved into an ineffective position. However, during repeat operations none of the amount keys are depressed, and therefore another means is provided for rocking the zero stop pawls to their ineffective positions. The repeat release key is provided with a stud 430 (Fig. 8), which upon depression of said key enters a slot 431 in an arm 432, secured to the shaft 433. Also secured to the shaft 433 for each of the amount and "To" banks is an arm 434 (Figs. 3 and 12), provided with a stud 435, which is adapted to engage the zero stop pawl 62 and rock it to its ineffective position, upon depression of the repeat release key.

Each arm 434 is also provided with a flange 436, which is rocked into the path of a pawl 437, pivoted on the flexible detent 57. Thus when the arms 434 are rocked by the depression of the repeat release key 164, the flexible detents 57, in the amount and "To" banks, are also locked against movement, and therefore, no key can be depressed in these banks after the repeat release key has been depressed.

*Repeat release key lockout mechanism*

The pawls 437 above described also provide a means for locking the repeat release key 164 against depression after one of the amount or "To" keys has been depressed. When the flexible detent has been operated by depression of the associated key, the pawl 437 will have moved into the path of the flange 436, thereby preventing movement of the arm 434, and by means of the shaft 433 and arm 432 (Fig. 8) will prevent depression of the repeat release key or manipulative member 164.

The arms 434 (Fig. 12) associated with the "To" and the amount banks of keys 67 and 50 respectively, are restored to their normal positions near the end of a repeating operation, by the combined influences of the springs 66, (Fig. 12), associated with the "To" and amount keys, the spring 179, (Fig. 8), and the spring 419.

The lower end 438 of the pawl 437 normally extends below the shoulder 439 of the detent 57 to provide a better factor of safety for the interlock between the amount or "To" keys and the repeat release key 164. In other words, a very slight depression of an amount or "To" key moves its associated pawl 437 into the path of the flange 436 on the arm 434, thus preventing any movement of the repeat release key. Due to the peculiar angle of movement of the flange 436, relatively to the shoulder 439, as the flange is moving towards the left (Fig. 12) when the repeat release key 164 is depressed, the flange 436 strikes the pawl 437, and rocks said pawl counter-clockwise until the flange rests against the shoulder 439. Since the pawls 437 are flexibly mounted, the springs 66, 179 and 419 have only to overcome a minimum amount of frictional interference as the arms 434 are restored to their normal positions by said springs.

Means is also provided to prevent the depression of the repeat release key after the machine has been released for an adding operation.

It will be remembered that, when the machine is released for an adding operation, the yoke member 157 (Fig. 8) is rocked clockwise, and, that the previously mentioned arm 163 is fast to said yoke member. When this occurs, the upper edge 442 of the arm 163 is rocked beneath the stud 430 on the repeat release key 164, thus preventing its depression.

When the machine is released for a repeat operation by depression of the repeat release key 164, as has been previously described, a recess 443 in the arm 163 engages the stud 430 on the key 164, when said key has been fully depressed, and holds the key in its depressed position until the yoke member 157 and arm 163 are restored to their normal positions near the end of the operation of the machine in the manner previously pointed out.

Key release throwout mechanism

It will be remembered that the cam 181 (Fig. 8) by operating the pitman 178, through arms 175 and 173 will rock the shaft 160 to lower the flexible detent 57 for releasing the keys at the end of the operation of the machine. During repeat operations, as just described, the arm 434 (Fig. 12), will be rocked far enough to cause the flange 436 thereon to be moved beneath the pawl 437, thereby locking the detent 57 against operation as above described. For this reason it is necessary, during repeat operations, to disconnect the driving connection between the cam 181 and the shaft 160.

The arm 432 is provided with a forwardly extending arm 440 (Fig. 8) which is connected to the pitman 178 by means of a link 441. Thus when the repeat release key 164 is depressed, and the arm 432 is rocked, as above mentioned, the arm 440 will lower the link 441, thereby lowering the forward end of the pitman 178 and in this manner disconnect the pitman from the stud 177 on the arm 175. Thus during repeat operations when the cam 181 is rotated, the pitman 178 will move idly and, therefore, the key release mechanism will be rendered ineffective.

Consecutive number and date printing mechanism

The machine is provided with the usual and well known consecutive numbering and date printing cylinder 444 (Fig. 26) and is of the type shown and described in Letters Patent of the United States issued to William Murphy, No. 541,247, on June 18, 1895. This cylinder is provided with date printing and consecutive number printing wheels and also with feeding flanges which co-operate with a tension roller 445 to feed the ticket or receipt paper in a usual and well known manner.

Receipt paper feeding mechanism

The receipt paper supply roll is carried on a stud 446 (Fig. 20), supported by a printer frame 447 and is fed to a paper chute 448. (See also Fig. 26.) From the paper chute 448, the paper is passed between the printing cylinder 444 and the tension roller 445. The cylinder is given one complete rotation for each operation of the machine. This rotating movement of the cylinder causes the paper to be fed from between the cylinder and the roller up to a second paper chute 449.

The paper chute 449 is attached to the knife operating means and therefore before the paper is fed, the knife 460 will have been moved into a position to the right (Fig. 26) far enough to permit the paper to be fed past the knife and into a third paper chute 450. From the chute 450 it is fed into the path of pairs of ejector rolls 451 and 452 to be hereinafter described. After the paper has been fed into the path of the ejector rolls the knife operating mechanism becomes effective to sever the printed portion of the strip so as to form a ticket or receipt, and, thereafter, the ejector mechanism ejects the tickets from the machine in a manner to be hereinafter described.

Paper severing mechanism

The knife 460 (Fig. 26) is secured to a knife arm 461, which is secured to a shaft 462, carried by the auxiliary printer frame 459. Also secured to the shaft 462 is an arm 463 (Fig. 25), having a roller 464 which projects into the cam race in a cam 465 secured to the auxiliary cam shaft 371. The cam 465 is adapted to first rock the knife 460 to the right (Fig. 26) far enough to permit the paper feeding mechanism to feed the paper past a stationary knife blade 466 and into the paper chute 450, as before described, then to the left to cause the paper to be severed. The knife blade 466 is supported at one end in a notch 467 in the printer frame 447 (Fig. 24), and at its other end in the printer plate 533. The paper chute 449 is secured to the knife 460 and therefore this paper chute moves with the knife when the knife is moved by the cam 465.

Ticket ejecting mechanism

Figure 27:
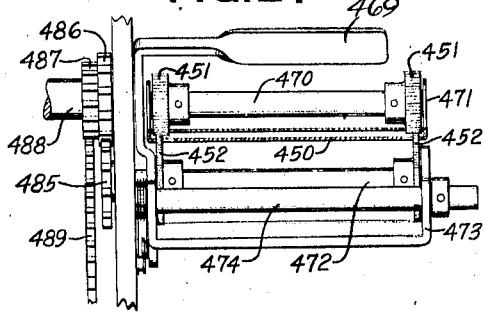
Fig. 27 is a front elevation of a part of the check ejector mechanism.
Figure 34:
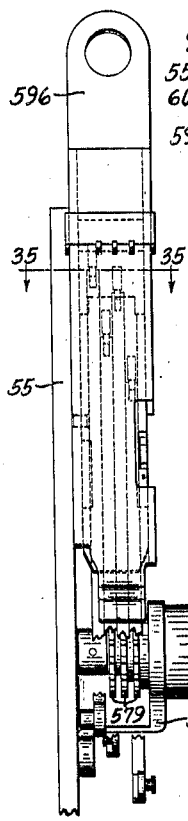
Fig. 34 is a front elevation of a modified form of operator's key and its associated mechanism.
Figures 35, 36:
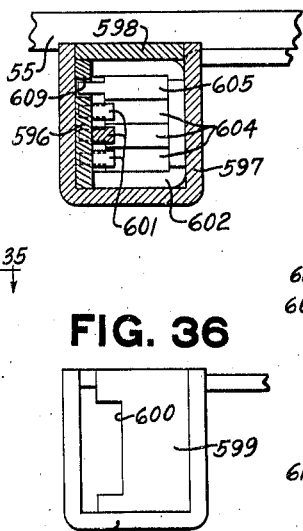
Fig. 35 is a detail sectional view, taken on line 35—35 of Fig. 34, and shows the operator's key inserted in the receptacle.
Fig. 36 is a detail top view of the operator's key receptacle.

The pair of ejector rolls 451 are secured to a short shaft 470 (Fig. 27) which is mounted in a pair of flanges 471 of the paper chute 450. The paper chute 450 is secured to the printer frame 447. The pair of ejector rolls 452 is secured to a shaft 472, carried in the arms of a bail 473, pivoted on a shaft 474. (See also Fig. 26.) The bail 473 is held in the position shown in Fig. 26 with the rollers 452 held in contact with the rollers 451 by means of a spring 475 which tends to rock the bail 473 in a counter-clockwise direction. One end of the spring bears against a stud 476 mounted in the frame 447, and is wrapped around the stud 474 and the other end bears against a stud 477 on the rearwardly extending arm of the bail 473. The bail 473 has a finger lever 469 so that the operator, by depressing this lever, can more readily feed a new ticket strip up through the chute 450 when necessary to supply the machine with a fresh ticket roll.

At the beginning of the operation of the machine, a cam 478 (Fig. 26), mounted on a shaft 479 will cause the bail 473 to be rocked in a clockwise direction to separate the rollers 452 from the rollers 451, thereby permitting the ticket paper to be fed into position between the rollers. The cam 478 is adapted to rock an arm 480 loosely mounted on a stud 481. The arm 480 lies in the path of the stud 477. When the arm 480 is rocked, its upper end engages the stud 477, thereby rocking the bail 473 clockwise to separate the rollers 452 from the rollers 451. A spring 482 holds a roller 483 on the arm 480 in contact with the cam 478.

The shaft 479 is given one complete rotation by means of an idler gear 497, which meshes with the gear 372 and with a gear 484, secured to the shaft 479.

After the paper has been fed into position between the rollers 451 and 452 and just before the knife 460 is operated to sever the ticket from the strip, the cam 478 will permit the arm 480 to be rocked back to its normal position by the spring 482, thereby permitting the spring 475 to move the rollers 452 against the rollers 451, for firmly gripping the ticket strip. After the rollers 452 have thus been moved into position, the knife 460 is operated and the ticket is severed from the strip.

After the ticket has thus been severed, the rollers 452 are given a rapid counter-clockwise rotation, thereby ejecting the severed ticket from the paper chute 450. This rapid rotation is obtained by means of a pinion 485 (Figs. 26 and 27), secured to the shaft 472, and meshing with a pinion 486 secured to a companion pinion 487, both of which are loosely mounted on a shaft 488. The pinion 487 meshes with a segment 489 (Fig. 26) loosely mounted on a sleeve 490 to be hereinafter described. The segment 489 meshes with a segment 491 mounted on the stud 481. The segment 491 is provided with a roller 492 which is held in contact with a cam 493 by means of a spring 494. The cam 493 is secured to the cam 478 and therefore rotates with it. The segment 489 first rocks in a clockwise direction and then in a counter-clockwise direction. The clockwise movement of the segment 489 takes place during the time that the rollers 452 are separated from the rollers 451 and therefore, is an idle one. However, the return or counter-clockwise movement of the segment 489 takes place after the rollers 452 have been moved into contact with the rollers 451, and therefore, during this counter-clockwise movement of the segment 489, the rollers 452 will be given a counter-clockwise movement by means of the pinions 485, 486 and 487. Since the ticket was severed from the strip before this latter movement of the segment 489, the counter-clockwise movement of the rollers 456 will eject the ticket to the position shown in Fig. 1. A spring-pressed pawl 495 (Fig. 26), is loosely pivoted on the support 496 for the upper paper chute and provides a means for holding the severed ticket in position until the operator removes the ticket from the paper chute.

*Ticket or receipt printing hammer*

An impression is made on the ticket from the type carriers 394 by means of a printing hammer 500 (Fig. 24) which is pivoted on a stud 501. The lower end of the hammer carries a stud 498 held in contact with an arm 502 by means of a spring 503. A spring 504 normally maintains a roller 499, and a block 506, both on the arm 502, in contact with a cam 505 on the main cam shaft 80. Rotation of the cam 505 rocks the arm 502 against the tension of the spring 504. The hammer 500 follows the arm 502 due to the spring connection 503 until the block 506 drops off the high point of the cam 505 thus allowing the arm 502 to be rocked in a counter-clockwise direction by the spring 504 to drive the hammer 500 against the type carriers 394. The paper upon which the record is printed is fed between the hammer 500 and an ink ribbon 507, to be hereinafter described, both of which are carried against the type carriers by the impelling force of the hammer 500.

*Detail strip hammer*

The impression is made upon a detail strip 510 by means of a hammer 511, which is pivoted on the stud 512 and is provided with a stud 513, which is held in contact with an arm 514 by means of a spring 515. The arm 514 is bifurcated to engage a stud 516 on the arm 502, and as the arm 502 is operated to take an impression on the ticket, the hammer 511 is similarly operated to take an impression on the detail strip.

*Detail strip feeding mechanism*

The detail strip is fed from a supply roll 520 (Fig. 20), to a receiving roll 521. The paper 510 (Figs. 20 and 24) is fed around five studs 522 supported by the printer frame 447. In this manner the paper is fed between the hammer 511 and the ink ribbon 507. The operating means for the detail strip feed consists of a feed pawl 523 which is pivoted on a forwardly extending arm 524 of the printing hammer operating arm 514. The pawl 523 is held in engagement with a ratchet wheel 525 on the receiving roll by means of a spring 526. During the initial movement of the arm 514 the pawl 523 will be lowered thereby feeding the detail strip one step. As the arm 514 returns to its normal position, the pawl is moved upwardly into engagement with the next tooth in position to feed the detail strip during the succeeding operation.

A retaining pawl 527, pivoted on the printer frame 447 is provided to prevent retrograde movement of the receiving roll. The retaining pawl is held in engagement with the ratchet wheel 525 by means of a spring 528.

*Ribbon feeding mechanism*

The ink ribbon 507 (Fig. 24) is fed from a spool 530 over eight studs 531 to another spool 530, and is guided through the machine in such a manner that it serves both the ticket and the detail strip. A reversing mechanism is provided so that when one of the spools 530 becomes empty the ribbon will be automatically reversed to cause the ribbon to be fed on the other roll. Each spool is caused to rotate on a stud 532 (Figs. 24, 31, 32 and 33).

Figure 24:
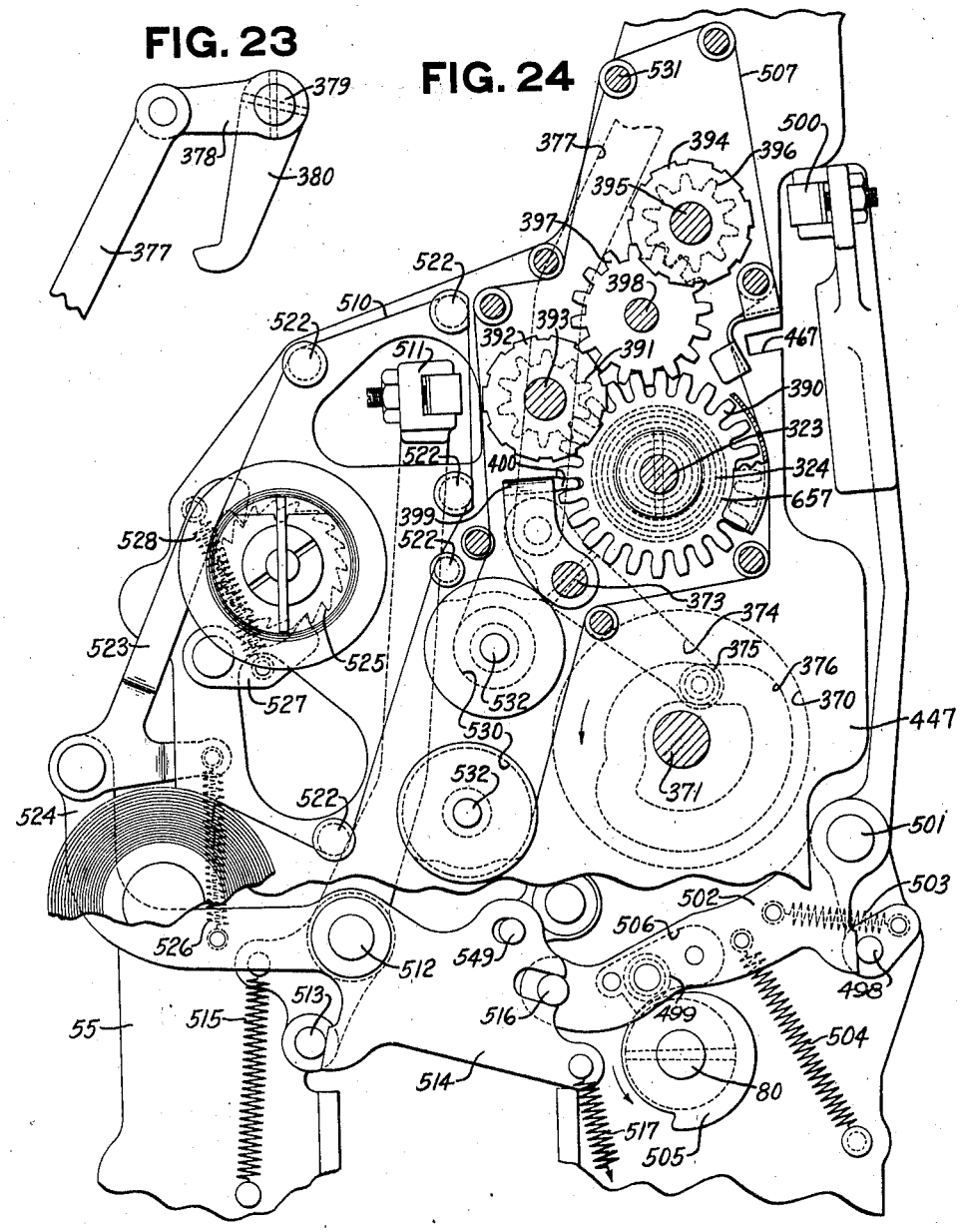
Fig. 24 is a sectional view taken through the printing mechanism, looking toward the left of the machine.
Figure 25:
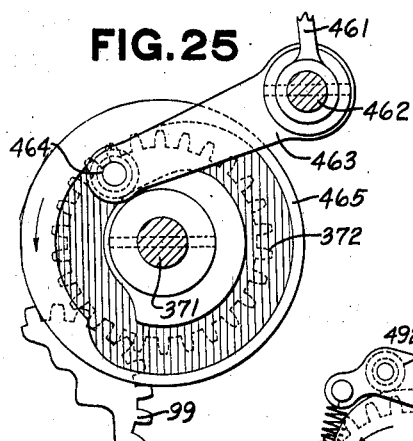
Fig. 25 is a detail view of the knife operating cam.

All of the studs 531 and the studs 532 are mounted on a printer plate 533 (Fig. 20) which is removable from the machine for placing a new ribbon in the machine. In this manner, by removing the printer plate 533 the ribbon, together with the ribbon spools are removed from the machine in the usual and well known manner. The spools 532 are adapted to slide over studs 540 (Fig. 31) secured to an auxiliary frame 541 attached to the right side frame 55. Loosely mounted on the stud 540 for each spool is a ratchet 542, which is provided with a clutch prong 543, adapted to engage an opening in the left end of the spool. A slide 544 is mounted on the frame 541 and is adapted to be operated by an arm 545. The slide 544 is provided with a stud 546 which projects into a slot in the frame 541. The right hand end of the slide 544 (Fig. 31) is supported on a roller 547 (Fig. 32) loosely mounted on the stud 540. Pivoted on the slide 544 is a carrying pawl 548 which is adapted to engage the ratchet 542 upon whichever spool the ribbon is being fed. The arm 545 is provided with a stud 549 projecting into an opening in the arm 514 (Fig. 24). Thus when the arm 514 is rocked as before described, the arm 545 will be rocked back and forth and by means of a stud 550, (Fig. 31) on the arm 545, which enters a notch in the slide 544, move the slide 544 and the pawl 548 first to the right and then to the left (Fig. 31), thereby causing the ratchet 542 and its corresponding spool to be turned to feed the ribbon. The pawl 548 is provided with a stud which engages a bifurcation of a reversing pawl 551 (Fig. 31) for moving the pawl 548 into a position in which it will operate the lower ratchet 542 when the ribbon has all been fed on the upper spool.

The mechanism for causing the ribbon to be reversed is of a type shown and described in Letters Patent of the United States issued to C. F. Rosien, No. 1,578,209, March 23, 1926. One flange of the spool 530 (Fig. 33) is cut away to form the edge 555. A ring 556 lying adjacent the mutilated flange of the spool 530 is pivoted at 552 to said flange. The ring 556 has a lip 553, and when the ribbon is wound on the spool, the ribbon holds the lip 553 against a flat side 554 of the spool hub, thus holding the ring 556 in such a position that it holds a finger 558 of an arm 557, from contacting the edge 555. However, as the spool 530 is emptied, the ribbon will permit the ring 556 to be rocked on its pivot 552, thereby permitting the flange 558 of the arm 557 to be moved into contact with the edge 555. The arm 557 is provided with a nose 559 (Fig. 32) which is moved into the path of the reversing pawl 551 (Figs. 31 and 33) when the spool is empty. Fig. 33 shows the reversing pawl 551 about to engage the nose 559. With the parts so positioned, the movement of the slide 544 to the left causes the pawl 551 to contact the nose 559, and as the slide 544 continues to move, the pawl 551 is rocked counter-clockwise, thus rocking the carrying pawl 548 about its pivot on the slide 544 to position said pawl 548 so that upon the next movement of the slide 544 to the right, the pawl will engage the lower ratchet 542 to feed the ribbon. The upper spool also has associated with it an arm 557, and both of the arms normally tend to move toward each other under influence of a spring 560 (Fig. 32). Thus when the end of the ribbon is reached on one spool the spring 560 will rock the particular arm 557 toward the opposite spool, thereby moving the nose 559 into the path of the reversing pawl 551 to reverse the mechanism for feeding the ribbon. The carrying pawl 548 is provided with a spring actuated plunger 561 (Fig. 31) for maintaining the carrying pawl in either of its positions.

Each ratchet has associated therewith a retaining pawl 562 which prevents retrograde movement of the spool which is being actuated. However, when the carrying pawl 548 is shifted to engage the opposite spool, a flange 563 on the carrying pawl 548 will engage the opposite retaining pawl, thereby disengaging it from the ratchet. In this manner only the retaining pawl which co-operates with the spool which is being actuated will be in effective position. A spring 564 (Fig. 31) is attached to both the retaining pawls and is adapted to hold one of the pawls in engagement with the ratchet and the other in engagement with the flange 563, as shown in Fig. 31.

The spools 530 can be removed from the machine when it is desired to replace the ribbon or if for any other reason it is desired to remove the ribbon assembly of the machine. However, the ratchets 542 and the arms 557 remain in the machine. For this reason, when the ribbon assembly is removed, the spools are removed therewith and the spring 560 will rock the arms 557 toward each other. Ordinarily this movement of the arms would position both of the noses 559 in the path of the pawl 551 and then if, for any reason, it would be desired to operate the machine with the ribbon assembly removed from the machine, it would be impossible to do so. In order to prevent more than one of the noses 559 from ever being in the path of the pawl 551, the arms 557 are provided with projections 570 which are so formed at their ends that only one of the arms 557 can be rocked under the influence of the spring 560 at one time. Therefore, even though the ribbon assembly has been removed from the machine, only one of the arms 557 will be moved and the machine can be operated.

*Operator's key*

It is impossible to release the machine for operation until after an operator's key has been inserted in the machine, and thus an absolute check on the operator who is using the machine is provided.

This interlock, as described heretofore consists of the arm 126 (Fig. 4) which is secured to the shaft 125. Secured to this shaft 125 (Fig. 30) is an arm 571, adapted to be engaged by a stud 572 (see also Fig. 29) of an operator's key 573. A spring 574 normally tends to rock the arm 571, shaft 125 and arm 126 in a counter-clockwise direction. However, with the key 573 inserted in a receptacle 575, provided therefore, the stud 572 engages the arm 571 and holds it against the tension of the spring 574 thereby holding the arm 126 in the position shown in Fig. 4, for permitting release of the machine as heretofore described. A latch 576 is provided for latching the key 573 in position after it has been inserted. A spring 577 maintains the latch 576 in its effective position.

Figure 23:
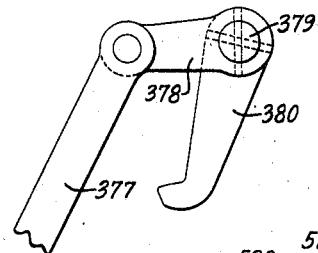
Fig. 23 is a detail view of a part of the indicator aligning mechanism.

The key 573 is provided with three racks 578 (Fig. 29) at its lower end, which are provided with any number of teeth. These racks are for setting type characters for designating which operator's key is inserted. The number of teeth on the racks 578, will determine the number which is set up on the type carriers. Each rack 578 engages a pinion 579 secured to one end of the sleeves 490, the other ends of which are provided with gears, similar to the idler gears 397 (Fig. 24), meshing with the pinions 580 (Fig. 28) on the operator's number type carriers 581. Thus it is seen that when the operator's key is inserted in the receptacle 575 the number of teeth on the racks 578 determines the setting of the type carriers 581. The receptacle 575 is provided with a flange 582 (Fig. 30) by means of which the receptacle is secured to the right side frame 55 (Fig. 23).

Each of the type carriers for the operator's number is held in alinement by means of an alining pawl 583 (Fig. 30) which is held in engagement with the pinion 579 by means of a spring 584. The end of the pawl 583 is so formed that the pinion can be rotated in either direction, and the pawl 583 will ratchet over the pinion.

The rod 398, upon which the sleeves 490 are mounted, is supported at one end, by a bracket 585, (Fig. 30) secured to the right side frame 55. The other end of the rod 398 is supported by the printer plate 533 (Fig. 20).

A stop 590 (Fig. 30), is provided for stopping the pinions 579 in the zero position when the operator's key 573 is removed from the machine. The stop 590 is secured to the bracket 585 and is in the path of a long tooth 591 on each of the pinions 579. When the operator's key is removed from the machine, the pinions 579 are rotated in a clockwise direction until they are stopped by the stop 590. In this position the type carriers are in their zero positions.

The racks 578 are provided with various numbers of teeth. If, however, a zero is to be printed by any of the type wheels, no teeth are provided on the rack 578 for that wheel and therefore when the operator's key is inserted, the particular character which is to print a zero, is not moved out of its normal position, but is held with the long tooth 591 against the stop 590.

The stop 590 also provides a means for preventing the type carriers from moving out of their normal positions and thereby setting up the incorrect numbers upon subsequent insertion of an operator's key. If the operator's key were to be removed from the receptacle too rapidly, the momentum of the type carrier and the gears and pinions connected thereto would be so great as to possibly overthrow the type wheels and therefore set up an incorrect number during the next insertion of the key. The stop 590 is therefore also an overthrow preventer for the type carriers.

Modified form of operator's key

Figure 37:
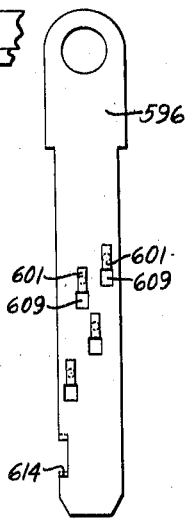
Fig. 37 is a detail view of the modified form of operator's key.
Figure 38:
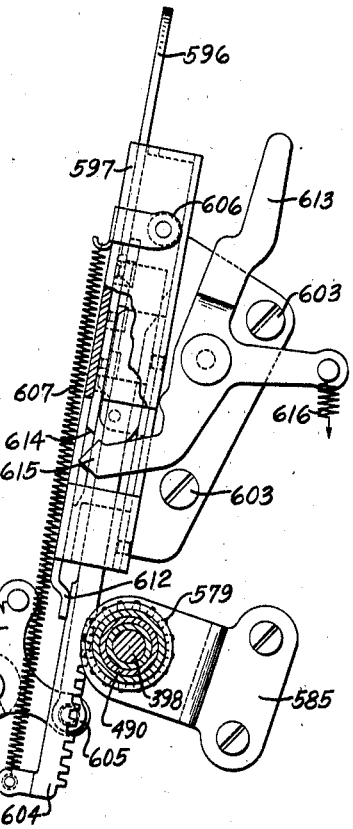
Fig. 38 is a side elevation of the modified form of operator's key and its associated mechanism, shown in Fig. 34.

A modified form of operator's key 596 is shown in Figs. 34 to 39. This form of key is insertable in the receptacle 597 (Fig. 35) and is guided by the closed side of the receptacle and by a filler bar 598, embraced by the side walls of the receptacle 597, and having a flange 599 (Fig. 36) at its upper end, extending part way across the mouth of the receptacle 597. Flange 599 has a recess 600 for permitting the entry of blocks 601 on the key 596. A U-shaped guide 602 is secured in the receptacle 597 and affords a means for preventing the key 596 from becoming disengaged from racks in the slide to be hereinafter described. The receptacle 597 is secured to the right side frame 55 of the machine by means of screws 603 (Fig. 38).

Slidably mounted within the U-shaped guide 602 are three racks 604 and a link 605. The racks 604 and link 605 are each held in their normal positions, in engagement with a roller 606 (Fig. 38) by means of a spring 607. Each of the racks 604 and the link 605 is formed at its upper end with a lug 608 (Fig. 39), which is adapted to be cammed into an opening 609 of the operator's key (Fig. 37). When the operator's key is removed from the receptacle, a cam edge 610 (Fig. 39) is in engagement with a camming edge 611 of the U-shaped guide 602. When in this position the lug 608 is disengaged from the opening 609 of the key. However, when the key is inserted the block 601 will engage a lug 608, thereby forcing the slide 604 downwardly and during this downwardly movement the cam edges 610 and 611 cause the slide 604 to be moved forwardly, thereby camming the lug 608 through the opening 609.

The distance the rack 604 is moved, depends on the location of the opening 609 and the block 601 on the key 596. By varying the location of the opening and block, the racks 604 can be moved any desired distance. In this manner the racks for the operator's key are adjusted to set the type carriers 581 in the same manner as said type carriers are set by the first form of operator's key previously described.

The rack 604 engages with the pinion 579, which is secured to the sleeve 490 and by means of which the type carriers 581 are adjusted, as above described. The link 605 is also adjusted by means of a block 601, and upon insertion of the operator's key the arm 571 (Fig. 38) is rocked to move the arm 126 out of the path of the release pawl 114, in the same manner as described for the first type of key.

The lower end of the receptacle 597 is formed with a flange 612, for holding the racks 604 in engagement with the pinions 579.

A spring actuated latch 613 pivoted to the flange on the receptacle 597 is adapted to project into a notch 614 in the operator's key (Fig. 37) thereby maintaining the key in its inserted position. Before the operator's key can be released, it is necessary to rock the latch 613 in a counter-clockwise direction, thereby removing the lower arm 615 from the notch 614. A spring 616 causes the arm 615 and the latch to rock through the notch 614, when the operator's key is inserted in the machine.

Total-taking operation

The machine has been described for performing adding and repeating operations. This machine is also capable of performing total-taking operations. The total control lever 162 (Fig. 1) has three positions, an "add", a "read", and a "reset" position. When it is desired to read the totals on a totalizer the lever is moved to the read position and the machine operated in the usual manner. However, if it is desired to read the totalizer and reset it to zero, the total lever is moved to the reset position and an operation of the machine will cause a total to be printed and the totalizer ot be reest to zero.

Reading operations

During reading operations the totalizer pinions 230 (Fig. 3) are rocked into engagement with the actuators 216 at the beginning of the operation of the machine. Then when the rod 221 is moved forwardly, each totalizer pinion will be rotated in a backward direction until the long tooth 302 (Figs. 3 and 17) is stopped by the forward end of the transfer trip pawl 300. In this position the totalizer pinions are set at zero and the amount which was standing on these totalizer pinions will have been transferred to the actuators 216. Then upon return of the rod 221, the amount will be again added on the totalizer and the indicators and type carriers will be adjusted accordingly in the same manner as they are adjusted in adding operations.

Figure 5:
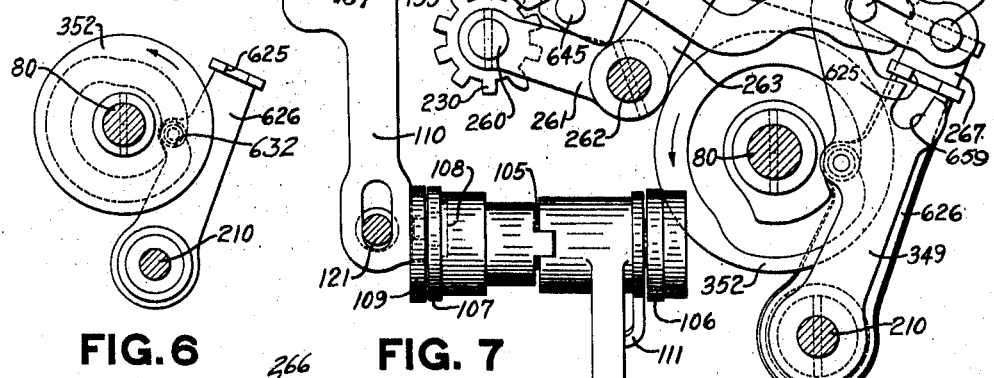
Fig. 5 is a detail view of the cam for engaging the totalizer with the actuators and for disengaging the totalizer from the actuators during "Read" operations.

The cam for controlling the engagement and disengagement of the totalizer during reading operations is shown in Fig. 5. In order to effect this change of timing, it is necessary to disengage the stud 265 (Fig. 4) from the notch 266 in the arm 267, and place it into a notch 625 (Fig. 5) of an arm 626. The stud 265 is adjusted by means of the total lever 162. The total lever is provided with a stud 627 (Fig. 4) which projects into a cam slot 628 of an arm 629. The arm 629 is pivoted on a stud 624 mounted in the right side frame 55 of the machine. As the total lever is raised to the read position, the stud 627, co-operating with the cam slot 628, will rock the arm 629 downwardly. The arm 629 is bifurcated to engage a stud 630 of the link 264. Thus as the arm 629 is rocked, the stud 265 will be disengaged from the notch 266 (Fig. 6), of the arm 267 and will be placed into the notch 625 (Fig. 5), of the arm 626.

The arm 626 is provided with a roller 632, which engages the cam race in the cam 352 mounted on the cam shaft 80. The cam race in the cam 352 is so timed as to engage the totalizer pinions 230 with the actuators 216 before the actuators move, and to disengage the pinions from the actuators after the rod 221 has been moved back to its normal position, so that the amount which was taken from the totalizer pinions will be again added on the totalizer, and the indicators and type carriers set up to indicate and print that amount.

During the time the total lever 162 is being moved out of the add position, the totalizer has a tendency to rock into engagement with the actuators due to the springs 289 (Fig. 3), on the transfer arms 291. These arms bear against the bell cranks 295 which are mounted on the arms 275 secured to the shaft 262. To prevent this engagement of the totalizer with the actuators a cam 640 (Figs. 3 and 41), secured to the shaft 80, is in the path of a square stud 641, on a rearward extension 642 of one of the arms 275, when the machine is home. Only one arm 275 is provided with the extension 642, all other arms 275 terminating with the dotted line 643 (Fig. 41). Since all arms 275 are secured to the shaft 262, the one cam 640 is sufficient to maintain all the arms 275 in their normal positions. The totalizer engaging arms 261 (Fig. 4), are also secured to the shaft 262, and therefore, the totalizer is also maintained in its normal position when the total lever 162 is shifted to withdraw the stud 265 from the notch 266, and until the stud is entered in the notch 265.

If desired, the machine can be built so that the total lever will have a "non-add" position. In such a machine it is necessary to provide a longer lever way for the total lever 162 (Fig. 1) so that the lever can be moved down below the "Add" position. In order to permit this adjustment the slot 628 (Fig. 4) is provided with a rearwardly extending portion which, when the lever is moved down will adjust the stud 265 to a neutral position in which it will not enter the notch in either of the arms 267 or 626.

As previously stated, the four "To" and "From" banks on the left hand end of the machine are used for setting up the indicators and type carriers during total-taking operations. For this purpose the segment 235 (Fig. 16), has been provided, in each of these banks. This segment is inactive during adding operations. During total-taking operations it is necessary to render this segment active. This is accomplished by means of a coupling arm 634, which is adapted to be rocked into engagement with a stud 635 carried on the actuator 216. The coupling arm is pivoted on the segment 235 and is provided with a stud 636 which projects through a cam slot in an arm 637, secured to the shaft 413. The shaft 413 receives a slight clockwise movement when the total lever is adjusted to the "Read" or "Reset" position. The shaft 413 receives this adjustment by means of a stud 638 (Fig. 13), secured to the arm 414. The total lever is provided with a cam surface 639, which contacts the stud 638 when the total lever is adjusted, thereby causing the shaft 413 to be rocked. Thus it is seen that when the total lever is moved out of the add position, the coupling arm 634 is connected to the actuator 216, thereby causing the segment 235 and the actuator 216 to move as a unit, during total-taking operations to perform the same function as the actuator 216 in the amount bank. As previously mentioned, the four higher order totalizer pinions 230 are in alinement with the teeth 236 of the segments 235 (Fig. 19) and therefore the four higher order pinions will control the differential movement of the segments 235 and in this manner the amount standing on the higher order totalizer pinions will be transferred to the indicators and the type carriers.

Before the totalizer pinions can control the differential movement of the actuators 216, it is necessary to move the zero stop pawls 62 to their ineffective positions which is accomplished by means of a stud 645, on the total lever 162 (Figs. 4, 12 and 13), which contacts a cam surface on the lower end of an arm 646, secured to the shaft 433, and rocks said arm 646 counter-clockwise when the total lever is moved out of the add position. The counter-clockwise movement of the arm 646 rocks the shaft 433 and the arms 434 (see also Figs. 3 and 12) counter-clockwise, thereby rocking the studs 435 thereon into engagement with the zero stop pawls 62 and in this manner moving them to their ineffective positions.

As will be remembered, the arms 434 are provided in the amount and "To" banks only, and therefore, this means for rocking the zero stop pawls to ineffective positions is effective in these banks only. Other means must be provided for rocking the zero stop pawls 62 in the "From" banks to their ineffective positions.

The means for rocking out the zero stop pawls in the "From" banks is shown in Fig. 10. Secured to the shaft 413, is a collar 647 for each of the "From" banks. The collar has a cam lobe 648 which engages a stud 649 when the total lever is moved out of its add position. The movement of the cam lobe 648 against the stud 649 causes an arm 650 to be rocked in a counter-clockwise direction to engage a stud 651 thereon with the zero stop pawl 62 in the "From" bank.

When the shaft 413 is returned to its normal position upon moving the total lever back to its home position, the arm 650 will return to its normal position due to the force of gravity. However, if for some reason the arm 650 sticks, a stud 652 on the collar 647 will engage a downward extension 653 of the arm 650, thereby positively camming the arm 650 back to its normal position.

The arm 650 is also provided with a flange 654, which co-operates with a flexible detent in the "From" bank in the same manner that the flange 436 (Fig. 12) co-operates with the detent for the amount and "To" banks.

A special type carrier 658 (Fig. 28) is provided for printing a character during read or reset operations. This type wheel is adjusted by means of a link 655 (Fig. 4), which connects the total lever to a disk 656 secured to a sleeve 657 (Figs. 4 and 24). The sleeve 657 has secured to the other end thereof a gear 390, which adjusts the type carrier 658 in the same manner as that described for the type carriers 392 and 394.

*Reset operations*

Figure 15:
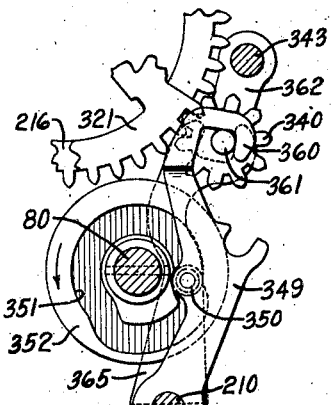
Fig. 15 is a detail view of the cam for engaging the totalizer with the actuators and disengaging the totalizer from its actuators during reset operations, together with the mechanism for controlling the two left hand or "From" banks for printing the total from the two highest order totalizer wheels.

The reset operation is performed in the same manner as a read operation, the only difference being that the totalizer is not held in engagement with the actuator 216 while the actuator is being restored. Therefore, the amount will not be re-entered in the totalizer. To control this timing of the engagement of the totalizer the stud 265 (Fig. 4), is moved into a notch 659 of the arm 349 (Figs. 4 and 15). This engagement is accomplished, by means of the arm 629 (Fig. 4), stud 627 and slot 628 in the same manner as for read operations.

However inasmuch as the "Reset" position is higher (Fig. 1) than the read position, the total lever is moved farther and therefore the lever 629 is moved a greater distance.

The arm 349 is rocked by means of the cam race in the cam 352, as before described, and the timing thereof is such that at the beginning of the operation the totalizer is engaged with the actuators and later again disengaged before the rod 221 is restored to its home position. Thus it is seen that with the totalizer disengaged, when the actuators 216 are restored, the amount will not be reentered, and therefore the totalizer will be left at zero.

*Total lever interlocks*

When the total lever is moved out of its add position, all of the keys except those in the transaction bank are locked against operation. Movement of the total lever 162 (Fig. 4) will cause the arm 646, by means of the stud 645, to be rocked in a counter-clockwise direction, thereby moving the flanges 436 (Figs. 3 and 12), beneath the pawls 437 on the flexible detents for the amount banks and the "To" banks. The cam surface 639 (Fig. 13) will rock the shaft 413 by means of the stud 638 secured to the arm 414. This movement of the shaft 413, raises the arm 650 and moves the flanges 654 (Fig. 10), into the paths of the pawls 437 pivoted on the detents for the "From" banks. In this manner all of the keys except those of the transaction bank will be locked against depression during total-taking operations.

As previously stated, the "From" banks of keys are staydown keys; that is, these keys will not be released at the end of the operation of the machine. Before the total lever can be moved, the keys in these banks must be released because if any key is depressed the pawl 437 will be in the path of the flange 654 and thereby prevent an adjustment of the total lever 162. In order to release a depressed key 68, it is necessary to press another key in the same bank down part way, far enough to move the flexible detent 57 down to release the key which has been depressed, but not far enough to lock the key, which is being operated, beneath the flexible detent.

Movement of the total lever out of adding position will also lock out the repeat release key 164. Rocking of the shaft 413 at this time will also rock the arm 412 in a clockwise direction, thereby positioning the locking surface 422 (Fig. 13) beneath the stud 410 on the repeat release key and in this manner prevent depression thereof.

The total lever 162 must be adjusted in one of its three positions before the machine can be released. The arm 161 (Fig. 4) is provided with a stud 670 which is rocked into a notch 672 in a block 671 when the total lever is in the "Add" position and the machine is released. The block 671 is carried by the total lever 162. However, if the machine is released with the total lever in the read position, the stud will rock into a notch 673 in the block 671. When the machine is released with the total lever in the "Reset" position, the stud 670 will rock beneath the block 671. If the total lever is in one of its intermediate positons, that is, between the "Add" and "Read", or "Read" and "Reset" positions, then when the motor bar 76 is depressed, the stud 670 will engage the surface of the block 671, thereby preventing the yoke member 157 from being rocked, and in this manner preventing the movement of the link 110 and preventing releasing of the machine.

Figure 40:
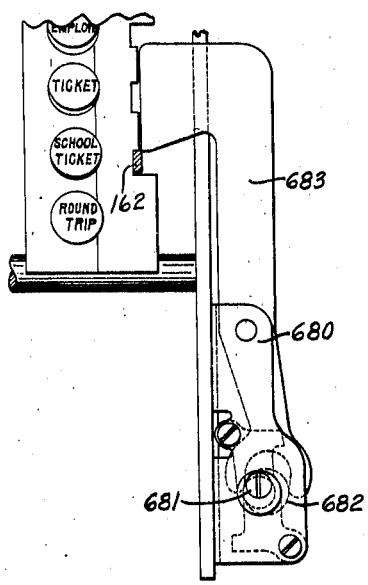
Fig. 40 is a detail view of the total control lever locking means.
Figure 39:
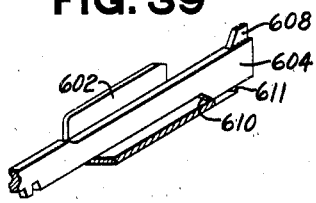
Fig. 39 is a detail perspective view of one of the slides shown in Fig. 38, for adjusting the operator's type carrier.

A lock has been provided for locking the total lever in any of its three positions. As shown in Fig. 40, the total lever 162 is shown locked in the "Add" position. Mounted in a bracket 680 is the key lock 681, which is provided with a barrel having an eccentric 682 which projects into a bifurcated lever 683 pivoted to bracket 680. The lever 683 is formed to be moved into the path of the lever 162 thus locking it against movement.

The total lever can be moved to any of the positions when the lever 683 is moved out of its locking position, but after the lever 683 is moved into its locking position, the total lever will be locked in position.

If after a "Reset" operation, it is desired to reenter the total on the totalizer, this may be done by the repeat mechanism in identically the same manner as for repeating an adding operation. At the end of the total-taking operation, the amount taken from the totalizer is standing on the indicators and the type carriers, and therefore in order to re-enter this amount, all that is necessary is to press the repeat release key 164 and operate the machine. During this operation the segment 321 (Fig. 3) will control the differential positioning of the actuators 216 in the same manner as during adding repeat operations. However, if the total is greater than $9.99, then, in the keyboard herein disclosed, the four higher totalizer pinions which in this disclosure are in the "To" and "From" banks, will not re-enter the amounts on the totalizer pinions. It should be remembered that these banks are illustrated herein only for the purpose of showing the system to which this particular machine is adapted. If desired, these four banks may be regular adding banks, and in that case the re-entry of the total can be accomplished in these four banks just as in the three lower amount banks.

*Operation*

A brief description of the operation and use of the machine will now be given.

The machine is located somewhere near the entrance of the bus, and as the passenger enters the bus the operator depresses the proper amount keys, the keys for the particular station at which the passenger boards and the bus, the keys representing the station to which the passenger is going. The operator then depresses a key in the transaction bank which will designate the kind of fare paid, that is, whether it is half-fare or round trip, or whatever the fare might be, after which the operator will depress the motor bar 76, which releases the machine for operation. If the machine is motor driven, the motor will be automatically released by depression of the motor bar 76. However, if it is a manually operated machine, the operator must turn the crank 75 twice after the motor bar 76 has been depressed.

If the next passenger is destined for the same station and buys the same kind of ticket, all that is necessary for the operator to do is to depress the repeat release key 164 whereupon the machine will be released for operation and the machine will issue a duplicate of the ticket and enter the same amount on the totalizer as in previous operation. In order to perform this repeat operation all that is necessary is to glance at the indicator to determine that the proper amount was previously entered, and then depress the repeat release key. It is not necessary that the operator know at the time the original entry is made that the next operation is to be a repeat operation.

An interlock is provided so that if any one of the amount or "To" keys are depressed after the original entry, the repeat release key will be locked against operation. However, the "From" station keys can be changed without effecting the locking out of the repeat release key. The operator may also depress any one of the transaction keys, inasmuch as one of these keys in this bank must always be depressed before the machine can be released for operation.

An operator's key 596, which is used to unlock the machine and to identify the operator, has been provided.

The totals standing on the totalizers can be "Read" without disturbing the setting on the totalizer or the total can be printed and the totalizer reset to zero. This is controlled by the total lever 162, which has three positions of adjustment, one "Add", one "Read" and one "Reset". A lock is provided so that the total lever can be locked in any one of these three positions. The movement of the total lever out of its adding position into one of its total-taking positions will control the engagement and disengagement of the totalizer with the actuators so that the totalizer will be properly engaged. During this total-taking operation, none of the keys excepting keys in the transaction bank, can be depressed, and therefore, the zero stop pawls for the amount banks and the "To" are not rocked to their ineffective positions by the keys as during the entry of items. For this reason mechanisms are provided to rock the zero stop pawls in the amount banks and in the "To" out of their effective positions in order to permit the actuators to be controlled by the totalizer pinions. This mechanism is operated by the total lever when it is moved out of its adding position to any one of its total-taking positions.

If the machine is to be used in a bus station rather than on the bus itself, all of the four left hand banks can be used as destination banks. In this case the total number of destination stations is 9,999. If the machine is to be used for any other business in which special banks are not required, these four banks can be used as amount banks, in which case the capacity of the machine would be $99,999.99.

While the forms of mechanisms herein shown and described are admirably adapted to fulfill the objects primarily stated, it is to be understood that it is not intended to confine the invention to the forms or embodiment herein disclosed, for it is susceptible of embodiment in various forms all coming within the scope of the claims which follow.

What is claimed:—

1. In a machine of the class described, an accumulating mechanism, an actuator therefor, and a repeat mechanism coacting with said actuator to control the same to repeat a previous movement when later desired, said repeat mechanism including a manipulative member operable subsequently to that operation during which the amount to be repeated is first accumulated.

2. In a machine of the class described, the combination with means for setting up an item and entering the same and then erasing the set-up to permit setting up another item, of optionally operable means associated with the item entering means to control the same after the set up has been erased to re-enter said erased set up.

3. In a machine of the class described including a differentially adjustable element and the combination of a repeat mechanism, also including a manipulative device operable subsequently to the operation in which the amount to be again repeated is accumulated for causing the repeat operation, a machine release mechanism, and means operable by said device for operating the machine releasing mechanism.

4. In a machine of the class described, the combination with means for setting up an item and entering the same and then erasing the set-up to permit setting up another item, of adjustable device controlled by said means, and a manipulative means for releasing the machine and for controlling said device to cause a repeat entry of the item previously entered.

5. In a machine of the class described, in combination with a keyboard for setting up an item, means for entering the item and means for erasing the set-up after the item has been entered, of mechanism adapted to be controlled by the item entering means, and means operable subsequently to the erasing of the set-up of said item, for controlling the mechanism to again enter said item.

6. In a machine of the class described, the combination of item keys and a differential actuator movable under control of said keys for entering an item in a totalizer, a differentially movable member adjustable under control of said actuator, coupling means to connect the actuator with the member, and means to control the coupling means to enable the differentially movable member to control the actuator to effect a repeat entry of said item in said totalizer.

7. In a machine of the class described, the combination of item keys and means controlled thereby for entering an item in a totalizer, for means releasing the machine for effecting the entry of such item, and means adapted to cooperate with the releasing means but operable subsequently to the entry of said item for causing said item to be again entered in said totalizer.

8. In a machine of the class described, the combination of item keys, a differentially movable actuator controlled thereby, a differentially movable member, a normally effective coupling means to connect the actuator and the member, means to disengage the coupling means from the actuator and member as the actuator is being positioned and again engaging said coupling means with the actuator and member so that said member may be under control of said actuator as items are entered under control of the item keys, and means to control the coupling means so that it maintains its normal effectiveness between said member and actuator to control the setting of the actuator by said member to repeat the entry of the item entered under control of the keys.

9. In a machine of the class described, the combination of an actuator adapted to advance from and return to a normal home position, manipulative devices adapted to differentially control the advance of the actuator, means to restore the actuator to its home position, a totalizer element adapted to engage the actuator during its travel in one direction, a driven member, a mechanism set by the driven member, coupling means to connect the actuator and driven member, a stop cooperating with said mechanism to arrest the driven member in one direction of its movement to control the movement of the totalizer element, means to engage and disengage the coupling means and the actuator and driven member to cause the driven member to be moved a distance corresponding to the movement of the totalizer element, and means to prevent disengagement of the coupling means at will.

10. In a machine of the class described, the combination of manipulative devices, an actuator, the excursions of which are differentially controlled by the manipulative devices, a driven member, mechanism set by the driven member, a coupling means between the actuator and driven member to enable the driven member to be differentially positioned by the actuator, means to control the coupling means to enable the said mechanism to control the excursions of the actuator in place of the manipulative devices and means to determine the extent of movement of said mechanism when it controls the excursions of the actuator.

11. In a machine of the class described, the combination of manipulative devices, an actuator, the excursions of which are differentially controlled by the manipulative devices, a totalizer element actuated by the actuator during its excursion in one direction, a driven member, a coupling means to releasably connect the actuator and driven member during the excursion of the actuator in one direction, a stop to limit the travel of the driven member in one direction, and means to control the coupling means to enable the driven member to control the excursions of the actuator exclusive of the manipulative devices.

12. In a machine of the class described, the combination of accumulating mechanism, means to effect the registration of amounts thereon, such means including manipulative devices set to represent the amounts to be accumulated, and means including a manipulative member to cause repeated accumulation of any of the amounts set up by the manipulative devices, the amount accumulated under control of the manipulative devices being accumulated prior to any operation of the manipulative member.

13. In a machine of the class described, the combination of a totalizer element, an actuator therefor, manipulative devices for controlling said actuator, means for restoring said devices at the end of the operation of the machine, members adapted to be positioned commensurate with the amount entered into said element, and a manipulative member operable subsequently to the return of the manipulative devices for causing the actuator to be placed under control of said members thereby causing the previously entered amount to be repeated.

14. In a machine of the class described, the combination of registering mechanism, means to effect the registration of different data, said means including manipulative devices to control the registering mechanism, means adapted to coact with first mentioned means to enable data originally determined by the operation of the manipulative devices to be repeatedly registered and a manipulative member coacting with the second means and operable at any time between the first registration of the data to be repeated and the operation of the first-named manipulative devices to control the second mentioned means.

15. In a machine of the class described, the combination of a registering mechanism, manipulative means for controlling the registrations by said registering mechanism, means normally in an operative position to control the registering mechanism for an operation subsequent to a registration controlled by the manipulative means, and means to automatically render said normally operative means ineffective.

16. In a machine of the class described, the combination of a registering mechanism, manipulative devices to control the registrations by said registering mechanism, a normally operative substitute mechanism for said devices to control registrations, means automatically rendering the substitute mechanism ineffective, and means operable at any time subsequent to a registering operation and before the operation of the manipulative devices, to disable the means for automatically rendering the substitute mechanism ineffective.

17. In a machine of the class described, the combination of a differentially adjustable actuator, a member, a coupling device for coupling the actuator with said member for transferring the setting of said actuator to said member, and means for subsequently controlling said coupling device for transferring the setting of the member to the actuator on subsequent operations.

18. In a machine of the class described, the combination of a differentially adjustable actuator, a member, a coupling device normally engaging both the actuator and the member, means for disengaging the coupling device from the actuator and the member for permitting differential adjustment of the actuator, said means adapted to re-engage the coupling device after the differential adjustment of the actuator, a driving means for returning the actuator to its normal position, thereby transferring the setting of the actuator to the member, and a manipulative device for preventing the coupling device from being disengaged from the actuator and member, thereby causing the setting of the member to be transferred back to the actuator for repeat operations.

19. In a machine of the class described, the combination of a key-controlled, differentially movable actuator, an indicator setting actuator, means for connecting said actuators to set up an indication under control of said keys, means for controlling said connecting means to first adjust the key-controlled actuator under control of the indicator actuator and then the indicator actuator under control of the key-controlled actuator, a totalizer element, a segment cooperable therewith, and a total control means for connecting said segment to said key-controlled actuator, and for controlling the engagement of the totalizer element with said segment for adjusting said indicator setting actuator while said connecting means is functioning.

20. In a machine of the class described, the combination of a totalizer, turn to zero mechanism therefor, total recording means under control of said mechanism, and means cooperating with said mechanism to control the same subsequently to a total recording operation to produce a duplicate total record.

21. In a machine of the class described; the combination of a totalizer; zeroizing mechanism therefor; total recording means; means to operate said mechanism to erase the total from the totalizer and set up said total in the recording means and erase the total from said mechanism; and a device adapted to coact with said operating means to restore the total to the zeroizing mechanism, the recording means, and totalizer subsequently to said erasures when later desired, said device including a manipulative member to establish the coaction between the device and the operating means.

22. In a machine of the class described; the combination of a totalizer; keys; an actuator adapted to enter items into the totalizer and turn the totalizer to zero; means to record items under control of the keys and totals under control of the totalizer; means cooperating with the actuator and operable after the completion of a total recording operation to cause the record of the total to be repeated during an immediate subsequent operation; and means operated upon an item entering operation immediately subsequent to an original total recording operation to prevent operation of the second-mentioned means.

23. In a machine of the class described; the combination of keys for setting up an item; a totalizer; means to enter into the totalizer the item set up; an adjustable member; means to erase the set up from the item entering means and keys and simultaneously adjust said member to preserve the item therein; and means to transfer the item from said member back into the item entering means.

24. In a machine of the class described, the combination of an actuator adapted to be differentially adjusted, an adjustable member, means to move the actuator and destroy the differential adjustment thereof and to adjust said member to preserve the differential adjustment taken from the actuator, and means to re-adjust the actuator under control of said member to restore the original differential adjustment to the actuator.

25. In a machine of the class described, the combination of an actuator adapted to be differentially adjusted, an adjustable member, means to move the actuator and destroy the differential adjustment thereof and to adjust said member to preserve the differential adjustment taken from the actuator, and means to re-adjust the actuator under control of said member to restore the original differential adjustment to the actuator, said means including a manipulative device operable subsequently to the destruction of the differential adjustment of the actuator to control the coaction between said actuator and said adjustable member.

26. In a machine of the class described, the combination of a totalizer; item keys; means controlled thereby for entering an item in the totalizer; means for releasing said keys after the item has been entered; a manipulative means to release the machine to cause the item set up to be entered in the totalizer, and to operate the key releasing means; adjustable means adjacent to and associated with the item entering means; a second manipulative means to release the machine for the next operation; and means controlled by the second manipulative means, and operated by the adjustable means, to cause the means theretofore controlled by the keys, to repeat the entry of the item previously entered.

27. In a machine of the class described, the combination of registering mechanism; manipulative devices to control the data registered by said mechanism; means adapted to cooperate with said registering mechanism, to determine the adjustment of the registering mechanism; and a manipulative means operable after a registering operation, and prior to another operation of the manipulative devices to cause said first-mentioned means to determine the adjustment of the registering mechanism to repeat the data last registered.

28. In a machine of the class described, the combination of a set of stay-down keys, and a set of keys automatically releasable at the end of an operation of the machine, said keys to control the entry of data in the machine; a differentially movable actuator controlled by each set of keys during operations of the machine in which a key of each set is in depressed position; members for each set of keys adapted to be set according to the data entered into the machine; coupling means for each set of keys to couple each movable actuator to each member; common operating means to control the coupling means during an operation of the machine in which the keys of both sets are in depressed positions, to first uncouple, and then couple, the actuators and members so that the data is set on said members; and means to control the common operating means to prevent the coupling means from uncoupling the actuators and members for the releasable keys so that said coupling means remains in the coupling position during the entire operation of the machine during which the releasable keys are not depressed, in order to first control the actuators according to the previous setting of the members, and then to control the setting of the members according to the setting of the actuators.

29. In a machine of the class described, the combination with a differentially adjustable actuator; of a device normally under the control of the actuator and adjustable correspondingly therewith; and means to enable the adjustable device to control the differential adjustment of the actuator in accord with the last previous adjustment of the adjustable device, whereby to successively repeat the last adjustment as many times as desired.

30. In a machine of the class described, the combination with a plurality of keys; actuators; and individual spring means to propel the actuators in one direction, under control of depressed keys upon adding operations; of a driven member for each actuator; means to releasably and separately couple each actuator and its respective driven member upon repeat operations; means common to all members and actuators to positively propel the respectively coupled driven members and actuators first in one direction and then in the reverse direction upon repeat operations; and means common to all of the driven members to arrest the travel of the driven members during such repeat operations.

31. In a machine of the class described, the combination of a totalizer element; an actuator therefor; manipulative devices to differentially control the excursions of the actuator, said manipulative devices returnable to ineffective positions at each operation of the machine; and repeat mechanism, including a member adapted to be differentially controlled by the actuator to enable a previously accumulated amount to be re-accumulated, said mechanism also including a manipulative device operable subsequently to the addition of the amount to be re-accumulated, to render the member effective to control the actuator.

32. In a machine of the class described, the combination of a totalizer element; an actuator therefor; manipulative devices to differentially control the excursions of the actuator, said manipulative devices returnable to ineffective positions at each operation of the machine; means, including an adjustable means to enable the actuator to duplicate the data last registered; and a manipulative device operable subsequently to the registration of the data to be duplicated to render said adjustable means effective.

33. In a machine of the class described, the combination of a plurality of keys; an actuator; spring means for driving the actuator under control of the keys for adding operations; means for positively driving the actuator in the same direction during repeat operations; and means for limiting the positive movement of the actuator during said repeat operations.

34. In a machine of the class described, the combination of a plurality of keys; an actuator; spring means for driving the actuator under control of said keys for adding operations; a driven member; means to couple the actuator with the driven member during repeat operations; and means to positively drive the driven member and the actuator during said repeat operations.

35. In a machine of the class described, the combination of a totalizer; normally operable amount-determining devices to set up the items intended for entry in the totalizer; a differentially adjustable actuator, the excursions of which are under control of the amount determining devices, to enter items in the totalizer; settable means normally adjustable under control of the differentially adjustable actuator as it enters the items in the totalizer, to represent corresponding items; and means to cause the settable means to control the actuator on an operation immediately subsequent to one wherein the manually operated amount determining devices have been operated, to effect a repeat entry on the totalizer of the item last set up, exclusive of the manually operated amount determining devices.

36. In a machine of the class described, the combination of a totalizer; manually operable amount-determining devices to set up the items intended for entry in the totalizer; a differentially adjustable actuator, the excursions of which are under control of the amount determining devices, to enter items in the totalizer; settable means; means to releasably connect the differential actuator and the settable means to render the latter adjustable under control of the differentially adjustable actuator, to represent corresponding items; and means to cause the settable means to control the actuator, to effect a repeat entry on the totalizer of the item last set up on the amount-determining devices.

37. In a machine of the class described, the combination of a totalizer; manually operable amount-determining devices to set up the items intended for entry in the totalizer; a differentially adjustable actuator, the excursions of which are under control of the amount-determining devices, to enter items in the totalizer; settable means; means to releasably connect the differential actuator and the settable means to render the latter adjustable under control of the differentially adjustable actuator, to represent corresponding items; and means operable upon the means which releasably connects the differential actuator and the settable means, to reverse the direction of control, whereby to enable the previously adjusted settable means instead of the amount-determining means to control the differential actuator to effect a re-entry on the totalizer of the amount last registered thereon.

38. In a machine of the class described, the combination with a totalizer and its actuating mechanism; and manipulative devices to control the registrations of amounts on the totalizer; of a normally operative substitute mechanism for the manipulative devices to control the actuating mechanism; means to automatically render the substitute mechanism ineffective during operations in which the manipulative devices are effective; and means operable at any time subsequently to a registering operation, to disable the means which automatically renders the substitute mechanism ineffective.

39. In a machine of the class described, the combination with a plurality of sets of keys; means to latch the keys in depressed positions; means to restore the keys; means to automatically release the depressed keys in certain sets as an incident to the operation of the machine; totalizer wheels appropriate to the denominational sets of automatically released keys; and differential actuators individual to the total wheels and controlled by the keys in their respective sets; of an adjustable member associated with each of the differential actuators; sectional means to couple each actuator with its respective adjustable member; means common to the several coupling means to control the latter during operations of the machine wherein keys of both the stay-down and automatically released sets are depressed; and means to render the common operating means ineffective to control the coupling means for the automatically released sets of keys to enable the adjustable members positioned by the preceding operation to control the differential actuators during part of the operation of the latter.

40. In a machine of the class described, an actuating device, and a repeat mechanism cooperating with said device, said mechanism including a manipulative controlling device to control the effectiveness of said mechanism to cause said mechanism to operate the actuating device to repeat the item entering movement performed prior to any adjustment of the manipulative controlling device.

41. In a machine of the class described, the combination of a totalizer, an actuator therefor, manipulative devices to differentially control the excursions of the actuator, said manipulative devices returnable to ineffective positions at the end of each operation of the machine, and a means coacting with the actuator to control the excursions thereof in addition to the manipulative devices to enable an amount originally set up by said devices to be again added on the totalizer, said means including a manipulative member operable subsequently to the return of the manipulative devices to ineffective positions.

42. In a machine of the class described, the combination of a totalizer, an actuator therefor, manipulative devices to differentially control the excursions of the actuator, said manipulative devices returnable to ineffective positions at each operation of the machine, and a controlling mechanism associated with said actuator to enable a previously accumulated amount to be again accumulated, said mechanism including a manipulative member operable subsequently to the return of the manipulative devices to ineffective positions.

43. In a machine of the class described, the combination with a settable element; an actuator therefor; and manipulative devices to control the position of the settable element; of a normally operable control means for the settable element; automatic means to render the normally operable control means ineffective upon an operation during which the manipulative devices are effective;

and means operable subsequently to an operation during which the manipulative devices were effective to disable the automatic means.

44. In a calculating machine of the class described, provided with manipulative devices operable to set up amounts; totalizer actuators controlled by the manipulatve devices; a totalizer on which the amounts set up by the manipulative devices are accumulated through the totalizer actuators; of means differentially adjustable during every operation of accumulating on the totalizer the amounts set up on the manipulative devices, to positions corresponding to the respective amounts set up by the manipulative devices, such adjustable means remaining where adjusted at the end of every operation to represent the last amount set up; and means to enable the adjustable means to control the totalizer actuators when it is desired to again accumulate the amount just previously accumulated.

45. In a calculating machine, the combination with manipulative devices operable to set up amounts; shiftable totalizer actuators, the excursions of which are variously arrested by the manipulative devices; a totalizer on which the amounts set up by the manipulative devices are accumulated by the totalizer actuators, of means differentially adjustable during the operation of the machine in accordance with the differential adjustment of the totalizer actuators, such adjustable means remaining where adjusted at the end of the operation to represent the last amount set up; and means to connect the adjustable means and the totalizer actuators when it is desired to again accumulate the amounts accumulated on the previous operation.

46. In a calculating machine, the combination with a totalizer; and manipulative devices to set up amounts to be accumulated in the totalizer; of a plurality of sets of members differentially adjustable under control of the manipulative devices, one of which sets is idly operated relatively to the totalizer, in the accumulation of successively different amounts, the members of which set remain where adjusted by the previous operation; and means to render effective the idly operated set of differentially adjustable members, to control the amount registered on the totalizer when accumulating identical amounts successively to avoid the repeated setting of the same amount by the manipulative devices.

47. In a calculating machine, the combination with a totalizer; and manipulative devices to set up amounts to be accumulated in the totalizer; of a plurality of sets of members differentially adjustable under control of the manipulative devices, to represent the amounts set up by the manipulative devices; one of which sets of members actuates the totalizer to accumulate thereon the amount set up by the manipulative devices; the remaining set of members being idly operated relatively to the totalizer in the accumulation of successively different amounts, the last-named set of members remaining where adjusted at the end of each operation; and means to enable the idly operated set of members to control the first-named set of members when it is desired to again accumulate the amount accumulated on the previous operation.

48. In a machine of the class described, the combination of differentially adjustable actuators; devices, one associated with each actuator and adapted to be adjusted to different extents under control of the actuators; a single member to positively move the differentially adjusted devices to a common point to adjust the actuators to different extents under control thereof, and then move the differentially adjusted actuators to a common point to adjust the devices to different extents.

49. In a machine of the class described, the combination with a plurality of differentially adjustable actuators, and a plurality of adjustable devices associated with those actuators; of manipulative devices to control the differential adjustments of the actuators; a single member to positively drive the actuators from their severally adjusted positions to a common point; means intermediate the actuators and devices whereby the driving of the actuators to the common point adjusts said devices varying extents; said common member also adapted to drive the differentially positioned devices to a common point whereby said intermediate means sets the actuators in various positions.

50. In a machine of the class described, the combination of a differential mechanism including a plurality of sets of elements, a common means to arrest the elements of one set in various positions of unlike locations; and another common means to adjust the elements of another set to different extents under control of the first-named set of elements.

51. In a machine of the class described, the combination of one or more totalizer elements; actuating means therefor; manipulative devices to determine the extent of movement of the actuating means to control the entry of data; means to restore all operated manipulative devices to normal positions to render them ineffective; and a single member operable to exercise a control over the actuating means to repeat the entry of the data represented by the previously operated manipulative devices subsequently to the return of those devices to their ineffective positions.

52. In a machine of the class described, the combination of an adjustable actuating device, means to control the adjustment thereof, and a potentially effective repeat mechanism including a manipulative member to render the repeat mechanism effective to cause said device to repeat a previous adjustment of said mechanism, said previous adjustment being performed prior to any manipulation of the manipulative member.

53. In a machine of the class described, in combination with means for setting up and entering items, of additional means cooperating with the item entering means to control the same, said additional means including a manipulative repeat control member to cause the item entered in the immediately previous operation to be again entered, said immediately previous operation being performed prior to any manipulation of the manipulative repeat control member.

54. In a machine of the class described, the combination of an accumulating mechanism, an actuator therefor, and a repeat mechanism co-acting with said actuator to control the actuator to repeat a previous movement of the actuator, said repeat mechanism constructed to effect such a control over the actuators only after the original entry is completed.

55. In a machine of the class described, the combination of an accumulating mechanism, an actuator therefor, and a repeat mechanism co-acting with said actuator to control the actuator to repeat a previous movement of the actuator when later desired, said repeat mechanism including a manipulative member to effect a control over the accumulating mechanism only after the original entry has been made.

56. In a machine of the class described, the combination of a mechanism adapted to perform data-entering operations, and a mechanical repeat mechanism including means coacting with the data-entering mechanism to repeat a data-entry operation performed prior to the manipulation of any part of the repeat mechanism.

57. In a machine of the class described, the combination of data-entering mechanism, devices automatically settable thereby, and a manipulative device operable after the data have been entered to control said devices to repeat the data-entering operation performed prior to any operation of the manipulative device.

58. In a machine of the class described, adapted to repeat data-entering operations, the combination of automatically settable devices, and means adapted to be subsequently manipulated to control the devices to repeat the entry performed prior to any adjustment of the manipulative means.

59. In a cash register, accumulating mechanism, adjustable amount keys to control the accumulating mechanism, a repeat mechanism including a manipulative member to repeat an amount entered before any prior operation of the manipulative member, means to control the repeat mechanism, exclusive of said member, in its adjusted position at the end of that operation during which the amount to be repeated is first accumulated, and means to restore the amount keys to their normal home positions at the end of said operation.

60. In a cash register, amount keys to enter original amounts, means to restore the amount keys to their normal home positions at the end of an entry operation, a repeat mechanism including a manipulative member to repeat an amount entered before any prior operation of the manipulative member, and means to control a portion of said repeat mechanism in its adjusted position when the amount keys are restored to their normal home positions at the end of said operation.

61. In a cash register amount keys to enter original amounts, means to restore the amount keys to their normal home positions at the end of an entry operation, a repeat mechanism including a manipulative member to repeat an amount entered before any prior operation of the manipulative member, to effect a repeat accumulation under control of the repeat mechanism, and means to maintain the repeat mechanism in its adjusted position at the end of an operation during which the amount keys were depressed, while the amount keys restore to their normal positions.

62. In a machine of the class described, the combination of accumulating mechanism; means to control registration of amounts thereon, such means including manipulative devices set to represent the amounts to be accumulated; an actuator; and means, including a manipulative member operable after the original amount has been entered, to control the actuators to again accumulate the original amount.

WILLIAM H. ROBERTSON.

CERTIFICATE OF CORRECTION.

Patent No. 1,929,652.  October 10, 1933.

WILLIAM H. ROBERTSON.

It is hereby certified that error appears in the printed specification of the above numbered patent requiring correction as follows: Page 1, line 22, for "prove" read provide; and line 48, for "tht" read the; page 8, line 103, for "to" read into; page 15, line 118, for "reest" read reset; page 17, line 131, strike out the word "and" and insert the same after "bus," in the same line; page 18, lines 80-81, claim 3, strike out the words "including a differentially adjustable element and" and insert a comma; and line 82, after "mechanism" strike out the comma and insert the words including a differentially adjustable element and; page 19, line 19, claim 10, after "devices" insert a semi-colon; page 23, line 87, claim 61, after "register" insert a comma; and that the said Letters Patent should be read with these corrections therein that the same may conform to the record of the case in the Patent Office.

Signed and sealed this 28th day of November, A. D. 1933.

F. M. Hopkins (Seal)  Acting Commissioner of Patents.